(12) United States Patent
Son et al.

(10) Patent No.: US 12,525,054 B2
(45) Date of Patent: Jan. 13, 2026

(54) FACE VERIFICATION METHOD AND APPARATUS

(71) Applicant: Samsung Electronics Co., Ltd., Suwon-si (KR)

(72) Inventors: Changyong Son, Anyang-si (KR); Deoksang Kim, Hwaseong-si (KR); Minsu Ko, Suwon-si (KR); Jinwoo Son, Seoul (KR); Seungju Han, Seoul (KR); Chang Kyu Choi, Seongnam-si (KR); Jae-Joon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 501 days.

(21) Appl. No.: 18/082,930

(22) Filed: Dec. 16, 2022

(65) Prior Publication Data

US 2023/0119080 A1    Apr. 20, 2023

Related U.S. Application Data

(63) Continuation of application No. 15/864,232, filed on Jan. 8, 2018, now Pat. No. 11,532,177.

(30) Foreign Application Priority Data

Mar. 28, 2017  (KR) .......................... 10-2017-0039489

(51) Int. Cl.
 *G06V 40/16*   (2022.01)
 *G06F 18/214*  (2023.01)
 (Continued)

(52) U.S. Cl.
 CPC .......... *G06V 40/171* (2022.01); *G06F 18/214* (2023.01); *G06F 18/22* (2023.01);
 (Continued)

(58) Field of Classification Search
 CPC .. G06V 40/171; G06V 10/751; G06V 10/809; G06V 40/168; G06V 40/172; G06T 7/001; G06T 2207/30201
 See application file for complete search history.

(56) References Cited

U.S. PATENT DOCUMENTS 8,073,287 B1   12/2011  Wechsler et al.
9,165,404 B2   10/2015  Han et al.
(Continued)

FOREIGN PATENT DOCUMENTS

CN    104615233 A    5/2015
CN    105512604 A    4/2016
(Continued)

OTHER PUBLICATIONS

Chinese Office Action issued on May 27, 2023, in counterpart Chinese Patent Application No. 201810209155.4 (7 pages in English, 5 pages in Chinese).
(Continued)

*Primary Examiner* — Ross Varndell
(74) *Attorney, Agent, or Firm* — NSIP Law

(57) ABSTRACT

A face verification method and apparatus is disclosed. The face verification method includes selecting a current verification mode, from among plural verification modes, to be implemented for the verifying of the face, determining one or more recognizers, from among plural recognizers, based on the selected current verification mode, extracting feature information from information of the face using at least one of the determined one or more recognizers, and indicating whether a verification is successful based on the extracted feature information.

15 Claims, 11 Drawing Sheets

(51) Int. Cl.

| | | |
|---|---|---|
| *G06F 18/22* | (2023.01) | |
| *G06F 18/25* | (2023.01) | |
| *G06F 21/32* | (2013.01) | |
| *G06N 3/08* | (2023.01) | |
| *G06Q 20/40* | (2012.01) | |
| *G06V 10/10* | (2022.01) | |
| *G06V 10/25* | (2022.01) | |
| *G06V 10/75* | (2022.01) | |
| *G06V 10/80* | (2022.01) | |
| *G06V 10/82* | (2022.01) | |

(52) U.S. Cl.
CPC ............ *G06F 18/254* (2023.01); *G06F 21/32* (2013.01); *G06N 3/08* (2013.01); *G06Q 20/40145* (2013.01); *G06V 10/25* (2022.01); *G06V 10/751* (2022.01); *G06V 10/809* (2022.01); *G06V 10/82* (2022.01); *G06V 40/161* (2022.01); *G06V 40/168* (2022.01); *G06V 40/172* (2022.01); *G06F 18/253* (2023.01); *G06V 10/17* (2022.01)

(56) References Cited

U.S. PATENT DOCUMENTS

| | | |
|---|---|---|
| 2005/0226509 A1 | 10/2005 | Maurer et al. |
| 2005/0238207 A1 | 10/2005 | Tavares |
| 2015/0125048 A1 | 5/2015 | Ikenoue |
| 2016/0104034 A1 | 4/2016 | Wilder et al. |
| 2016/0328623 A1 | 11/2016 | Kim et al. |

FOREIGN PATENT DOCUMENTS

| | | | |
|---|---|---|---|
| CN | 106169075 A | 11/2016 | |
| JP | 62-212781 A | 9/1987 | |
| JP | 2000-215308 A | 8/2000 | |
| JP | 2001-307102 A | 11/2001 | |
| JP | 2003-67744 A | 3/2003 | |
| JP | 2003-132339 A | 5/2003 | |
| JP | 2008-52549 A | 3/2008 | |
| JP | 2010-244365 A | 10/2010 | |
| JP | 2015-18401 A | 1/2015 | |
| JP | 2015-194947 A | 11/2015 | |
| JP | 2016-40684 A | 3/2016 | |
| JP | 2016-167164 A | 9/2016 | |
| JP | 2017-10543 A | 1/2017 | |
| KR | 10-2010-0053194 A | 5/2010 | |
| KR | 101070442 B1 * | 10/2011 | ........... G06V 40/161 |
| KR | 20130035847 A * | 4/2013 | ........... G07F 19/207 |
| KR | 10-1336096 B1 | 12/2013 | |
| KR | 10-2016-0033552 A | 3/2016 | |
| KR | 10-2016-0061856 A | 6/2016 | |

OTHER PUBLICATIONS

Osadciw, L., et al., "Improving Personal Identification Accuracy Using Multisensor Fusion for Building Access Control Applications.", *Proceedings of the Fifth International Conference*, Jul. 2002, pp. 1176-1183.

Beattie, M et al., "Combining Verification Decisions in a Multi-Vendor Environment," Proceedings of the 5th International Conference on Audio-and Video-Based Biometric Person Authentication, Jul. 2005, pp. 406-415.

Ross, Arun A et al., "*Handbook of Multibiometrics*", Springer Science & Business Media, vol. 6, Dec. 2006, (3 pages in English).

Zhang, Ping. "A Video-Based Face Detection and Recognition System Using Cascade Face Verification Modules." *Applied Imagery Pattern Recognition Workshop*, Oct. 2008, pp. 1-8.

Extended European Search Report issued on Aug. 6, 2018 in Corresponding European Patent Application No. 18164571.4 (11 pages in English).

Korean Office Action issued on May 3, 2021, in Counterpart Korean Application No. 10-2017-0039489 (6 pages in English and 7 pages in Korean).

Notice of Preliminary Rejection issued on Feb. 1, 2022, in counterpart Japanese Patent Application No. 2018-042975 (10 pages in English and 12 pages in Japanese).

* cited by examiner

FACE VERIFICATION METHOD AND APPARATUS

CROSS-REFERENCE TO RELATED APPLICATION(S)

This application is a continuation of U.S. patent application Ser. No. 15/864,232 filed on Jan. 8, 2018, claims the benefit under 35 USC § 119(a) of Korean Patent Application No. 10-2017-0039489 filed on Mar. 28, 2017, in the Korean Intellectual Property Office, the entire disclosure of which is incorporated herein by reference for all purposes.

BACKGROUND

1. Field

The following description relates to technology for verifying a face.

2. Description of Related Art

Face verification technology of biometric authentication technology may include authentication technology for determining whether a user is valid based on a face appearing in a static image or a moving image. Such face verification technology has an advantage that contactless verification may be performed on a verification target.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, a processor implemented method of verifying a face includes selecting a current verification mode, from among plural verification modes, to be implemented for the verifying of the face, determining one or more recognizers, from among plural recognizers, based on the selected current verification mode, extracting feature information from information of the face using at least one of the determined one or more recognizers, and indicating whether a verification is successful based on the extracted feature information.

The method may further include acquiring a recognizer based on the determination of the one or more recognizers, where the extracting of the feature information may include applying image information derived from a determined face region of an image to the acquired recognizer, to generate the extracted feature information.

The method may further include performing a first normalizing of the determined face region of the image to generate the image information in a form predetermined suitable for application to the acquired recognizer, where the acquired recognizer may be a trained neural network or machine learning model.

The method may further include performing respective normalizations of a determined face region of an image to generate respective image information in respective forms predetermined suitable for application to different acquired recognizers based on the current verification mode, the extracting of the feature information including extracting respective feature information from the respective image information using the different acquired recognizers, and the indicating of whether the verification is successful includes performing the indicating of whether the verification is successful based on at least one of the extracted respective feature information.

At least one of the respective normalizations may include synthesizing image information with respect to an occlusion, or prediction of the occlusion, in the determined face region of the image.

The method may further include performing the verification, including performing a first verification based on a first extracted feature information from among the extracted respective feature information, selectively performing a second verification based on a second extracted feature information from among the extracted respective feature information, and, dependent on whether the second verification is selectively performed, selectively performing a third verification based on the first extracted feature information and the second extracted feature information and determining whether the verification is successful based on a result of the third verification.

The method may further include performing the extracting of the feature information including extracting respective feature information from respective normalizations of a determined face region of an image using different determined recognizers based on the current verification mode, where the performing of the extracting of the respective feature information may be selectively partially performed, based on the current verification mode, to focus on one of usability and security in the verifying of the face.

The determining of the one or more recognizers may include determining a plurality of different recognizers for the verification and performing the verification based on a select combination and/or arrangement of the different recognizers dependent on the current verification mode.

The performing the verification may include selectively performing respective verification processes corresponding to the different recognizers based on the current verification mode.

The respective verification processes may each include comparing respective similarities, between differently extracted feature information and corresponding registration information, with corresponding thresholds.

The plurality of different recognizers may include a first neural network model recognizer and a second neural network model recognizer, the first neural network model recognizer and the second neural network model recognizer being characterized as having been respectively trained using one or more different pieces of training data, and where the first neural network model recognizer may be trained to perform low light face feature extraction for low light condition face verification and the second neural network model recognizer may be trained with training data associated with a face region including one or more occlusion regions.

The extracting of the feature information may include extracting first feature information from image information derived from a determined face region of an image using a first recognizer, where the method may further include performing the verification, including determining a first verification result based on the first feature information, and determining whether to extract second feature information using a second recognizer based on the first verification result and the current verification mode, where the plural recognition modes may include at least a first verification mode and a different second verification mode.

The extracting of the feature information may include extracting the second feature information from the image information, or other image information derived from the determined face region of the image or a determined face region of another image, using the second recognizer in response to the determining of whether to extract the second feature information being a determination that the second feature information is to be extracted, and the performing of the verification further may include determining a second verification result based on the second feature information, and determining whether the verification is successful based on the second verification result.

In response to the current verification mode being selected to be the first verification mode, the method may include determining that a final verification result is failure in response to the second verification result being failure, and determining that the final verification result is success in response to the second verification result being success.

In response to the current verification mode being selected to be the second verification mode, the method may include determining that the second feature information is to be extracted in response to the first verification result being success, and determining, in response to the second verification result being success, that a final verification result is success.

In response to the current verification mode being selected to be the first verification mode, the method may include determining that the second feature information is to be extracted in response to the first verification result being failure, and determining, in response to the first verification result being success, that a final verification result is success and terminating a face verification process.

In response to the current verification mode being selected to be the second verification mode, the method may include determining, in response to the first verification result being failure, that a final verification result is failure and terminating a face verification process, and determining that the second feature information is to be extracted in response to the first verification result being success.

The determining of the first verification result may include determining the first verification result based on a comparing of the first feature information to first registered feature information previously extracted using the first recognizer.

The method may further include selectively updating the first registered feature information based on the first feature information and in response to the first verification result being success.

The method may further include determining a second verification result based on a comparing of the second feature information to second registered feature information previously extracted using the second recognizer.

The method may further include selectively updating the second registered feature information based on the second feature information and in response to the second verification result being success.

The determining of the first verification result may include calculating a similarity between the first feature information and first registered feature information previously extracted using the first recognizer, and determining the first verification result based on a result of a comparison between a first threshold and the similarity.

The extracting of the feature information may include detecting a face region from an input image, detecting facial landmarks from the detected face region, and normalizing the face region based on the detected facial landmarks to generate the information of the face.

In one general aspect, provided is a non-transitory computer-readable medium storing instructions, which when executed by a processor, cause the processor to implement one or more, any combination, or all processes and methods described herein.

In one general aspect, an apparatus for verifying a face includes one or more processors configured to select a current verification mode, from among plural verification modes, to be implemented for the verifying of the face, determine one or more recognizers, from among plural recognizers, based on the selected current verification mode, extract feature information from information of the face using at least one of the determined one or more recognizers, and indicate whether a verification is successful based on the extracted feature information.

The one or more processors may be further configured to acquire a recognizer based on the determination of the one or more recognizers, where the one or more processors may be configured to apply image information derived from a determined face region of an image to the acquired recognizer, for generating the extracted feature information.

The one or more processors may be further configured to perform a first normalizing of the determined face region of the image to generate the image information in a form predetermined suitable for application to the acquired recognizer, where the acquired recognizer may be a trained neural network or machine learning model.

The one or more processors may be further configured to perform respective normalizations of a determined face region of an image to generate respective image information in respective forms predetermined suitable for application to different acquired recognizers based on the current verification mode, perform the extracting of the feature information by extracting respective feature information from the respective image information using the different acquired recognizers, and perform the indicating of whether the verification is successful based on at least one of the extracted respective feature information.

For at least one of the respective normalizations, the one or more processors may be further configured to synthesize image information with respect to an occlusion, or prediction of the occlusion, in the determined face region of the image.

The one or more processors may perform a first verification based on a first extracted feature information from among the extracted respective feature information, selectively perform a second verification based on a second extracted feature information from among the extracted respective feature information, and, dependent on whether the second verification is selectively performed, selectively perform a third verification based on the first extracted feature information and the second extracted feature information and determine whether the verification is successful based on a result of the third verification.

To perform the extracting of the feature information, the one or more processors may be configured to extract respective feature information from respective normalizations of a determined face region of an image using different determined recognizers based on the current verification mode, where the performing of the extracting of the respective feature information may be selectively partially performed by the one or more processors, based on the current verification mode, to focus on one of usability and security in the verifying of the face.

The one or more processors may be configured to, based on the current verification mode, determine a plurality of different recognizers for the verification and perform the verification based on a select combination and/or arrangement of the different recognizers dependent on the current verification mode.

To perform the verification, the one or more processors may be configured to selectively perform respective verification processes corresponding to the different recognizers based on the current verification mode.

The respective verification processes may each include comparing respective similarities, between differently extracted feature information and corresponding registration information, with corresponding thresholds by the one or more processors.

The one or more processors may be further configured to extract first feature information from image information derived from a determined face region of an image using a first recognizer, to perform the extracting of the feature information, determine a first verification result based on the first feature information, to perform the verification, and determine whether to extract second feature information using a second recognizer based on the first verification result and the current verification mode, were the plural recognition modes may include at least a first verification mode and a different second verification mode.

The one or more processors may be further configured to extract the second feature information from the image information, or other image information derived from the determined face region of the image or a determined face region of another image, using the second recognizer in response to the determining of whether to extract the second feature information being a determination that the second feature information is to be extracted, determine a second verification result based on the second feature information, to further perform the verification, and determine whether the verification is successful based on the second verification result.

In response to the current verification mode being selected to be the first verification mode, the one or more processors may be configured to perform the verification to determine that a final verification result is failure in response to the second verification result being failure, and determine that the final verification result is success in response to the second verification result being success.

In response to the current verification mode being selected to be the second verification mode, the one or more processors may be configured to perform the verification to determine that the second feature information is to be extracted in response to the first verification result being success, and determine, in response to the second verification result being success, that a final verification result is success.

In response to the current verification mode being selected to be the first verification mode, the one or more processors may be configured to determine that the second feature information is to be extracted in response to the first verification result being failure, and determine, in response to the first verification result being success, that a final verification result is success and terminate a face verification process.

In response to the current verification mode being selected to be the second verification mode, the one or more processors may be configured to determine, in response to the first verification result being failure, that a final verification result is failure and terminate a face verification process, and determine that the second feature information is to be extracted in response to the first verification result being success.

The one or more processors may be configured to determine the first verification result based on a comparing of the first feature information to first registered feature information previously extracted using the first recognizer.

The one or more processors may be configured to selectively update the first registered feature information based on the first feature information and in response to the first verification result being success.

The one or more processors may be configured to determine the second verification result based on a comparing of the second feature information to second registered feature information previously extracted using the second recognizer.

The one or more processors may be configured to selectively update the second registered feature information based on the second feature information and in response to the second verification result being success.

The one or more processors may be configured to calculate a similarity between the first feature information and first registered feature information previously extracted using the first recognizer, and determine the first verification result based on a result of a comparison between a first threshold and the similarity.

The one or more processors may be configured to detect a face region from an input image, detect facial landmarks from the detected face region, and normalize the face region based on the detected facial landmarks to generate the information of the face.

In one general aspect, a computing apparatus includes a first recognizer including a neural network model configured to extract first feature information from an input image including a face region of a user, a second recognizer including another neural network model configured to extract second feature information from the input image, the second feature information being different from the first feature information, and one or more processors configured to determine that a face recognition is successful in response to at least one of a first verification result and a second verification result being success, wherein the first verification result is obtained by comparing the first feature information to first registered feature information and the second verification result is obtained by comparing the second feature information to second registered feature information.

The neural network model of the first recognizer and the other neural network model of the second recognizer may each be configured as having been respectively trained based on at least different pieces of training data.

The other neural network model of the second recognizer may be configured as having been trained based on training data associated with a training face region including, or predicted to include, an occlusion region.

An image, obtained by substituting a region that is predicted to have an occlusion region in the face region with image information of a corresponding region in an average image, an average value image, or a single color image, may be input to the other neural network model of the second recognizer for the extracting of the second feature information.

The region that is predicted to have the occlusion region may be a region in which an occlusion is predicted to occur in the face region due to any one or any combination of any two or more of glasses, sunglasses, hat, and mask occlusions.

The one or more processors may be configured to release a lock mode of the computing apparatus in response to the face recognition being successful, and in response to at least both the first verification result and the second verification result being failures, the one or more processors may be configured to maintain the lock mode or to not release the lock mode.

In one general aspect, a computing apparatus may include a first recognizer including a neural network model configured to extract first feature information from an input image including a face region of a user, a second recognizer including another neural network model configured to extract second feature information from the input image, the second feature information being different from the first feature information, and one or more processors configured to determine that a face recognition is failed in response to at least one of a first verification result and a second verification result being failure, wherein the first verification result is obtained by comparing the first feature information to first registered feature information and the second verification result is obtained by comparing the second feature information to second registered feature information.

The neural network model of the first recognizer and the other neural network model of the second recognizer may each be configured as having been respectively trained based on at least different pieces of training data.

The other neural network model of the second recognizer may be configured as having been trained based on training data associated with a training face region including, or predicted to include, an occlusion region.

An image, obtained by substituting a region that is predicted to have an occlusion region in the face region with image information of a corresponding region in an average image, an average value image, or a single color image, may be input to the other neural network model of the second recognizer for the extracting of the second feature information.

The region that is predicted to have the occlusion region may be a region in which an occlusion is predicted to occur in the face region due to any one or any combination of any two or more of glasses, sunglasses, hat, and mask occlusions.

In response to the face verification being failed, the one or more processors may be configured to determine that a verification result is failure in a payment service or a financial service, and, in response to at least both the first verification result and the second verification result being successes, the one or more processors may be configured to determine that the verification result is successful in the payment service or the financial service.

The computing apparatus may further include a transceiver, and, in response to the determination that the verification result is successful in the payment service or the financial service, the one or more processors may be configured to control the transceiver to transmit payment information to an external terminal, configured to perform a financial transaction according the financial service, and/or configured to provide a user interface with financial information according to the financial service.

In one general aspect, a computing apparatus includes a first recognizer including a neural network model configured to extract first feature information from an input image including a face region of a user, a second recognizer including another neural network model configured to extract second feature information from the input image, the second feature information being different from the first feature information, and one or more processors configured to determine a current verification mode, from among at least a first verification mode and a second verification mode, to be implemented to verify the user, the one or more processors being further configured, in response to the current verification mode being determined to be the first verification mode, to determine that a face recognition is successful in response to at least one of a first verification result and a second verification result being success, wherein the first verification result is obtained by comparing the first feature information to first registered feature information and the second verification result is obtained by comparing the second feature information to second registered feature information, and the one or more processors being further configured, in response to the current verification mode being determined to be the second verification mode, to determine that a face recognition is failed in response to at least one of the first verification result and the second verification result being failure.

The first verification mode may be a predetermined unlock verification mode, determined to be implemented by the one or more processors when the user attempts to unlock a user interface of the computing apparatus, or controlled to be automatically implemented by the one or more processors when the computing apparatus is in a locked state.

The second verification mode may be a predetermined payment verification mode, determined to be implemented by the one or more processors when the user accesses or selects a payment service of the computing apparatus.

Other features and aspects will be apparent from the following detailed description, the drawings, and the claims.

Figure 1:
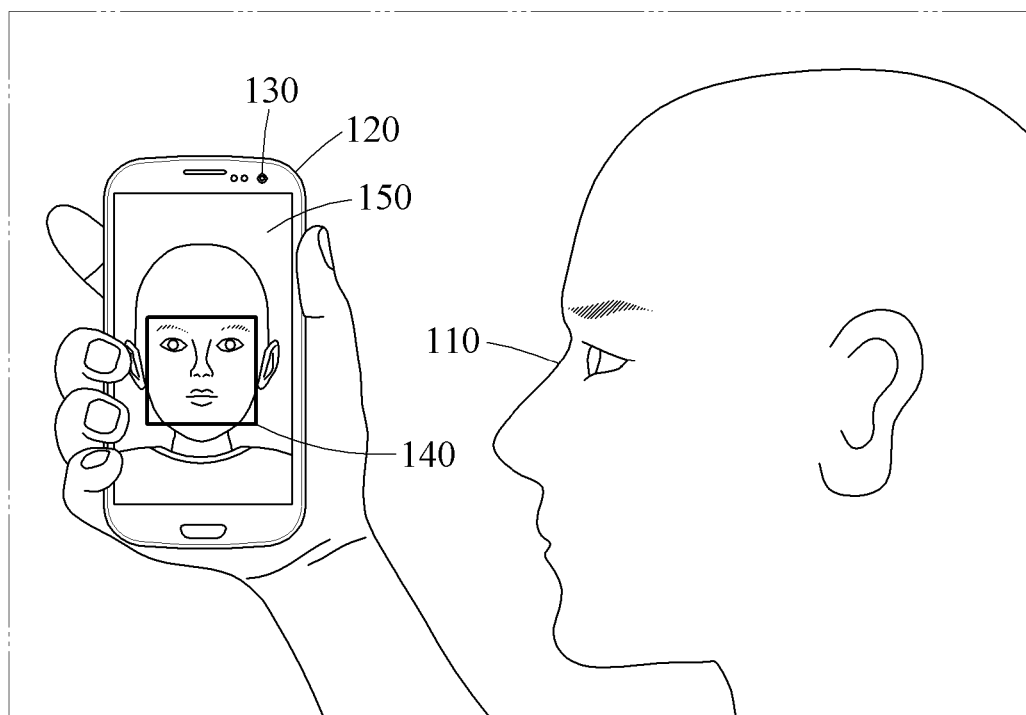
FIG. 1 is a diagram illustrating an example of face verification in accordance with one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. The sequences of operations described herein are merely examples, and are not limited to those set forth herein, but may be changed as will be apparent to after an understanding of the disclosure of this application, with the exception of operations necessarily occurring in a certain order. Also, descriptions of functions and constructions that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component.

The terminology used herein is for the purpose of describing particular examples only, and is not to be used to limit the disclosure. For example, as used herein, the terms "a," "an," and "the" are intended to include the plural forms as well, unless the context clearly indicates otherwise. As further used herein, the terms "include, "comprise," and "have" specify the presence of stated features, numbers, operations, elements, components, and/or combinations thereof in one or more example embodiments, but do not preclude the presence or addition of one or more other features, numbers, operations, elements, components, and/or combinations thereof in alternative embodiments, nor the lack of such stated features, numbers, operations, elements, components, and/or combinations thereof in further alternative embodiments unless the context and understanding of the present disclosure indicates otherwise. In addition, the use of the term 'may' herein with respect to an example or embodiment, e.g., as to what an example or embodiment may include or implement, means that at least one example or embodiment exists where such a feature is included or implemented while all examples and embodiments are not limited thereto.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

FIG. 1 is a diagram illustrating an example of face verification in accordance with one or more embodiments.

Face verification is a verification method of determining whether a user attempting to be verified is valid user based on a face of the user. Referring to FIG. 1, a face verification apparatus is included in, or represented by, a computing apparatus 120. The computing apparatus 120 is, for example, a smartphone, a wearable device, a tablet computer, a netbook, a laptop computer, a desktop computer, a personal digital assistant (PDA), a set-top box, home appliances, biometric locks, a security system, and a vehicle starting system.

As non-limiting examples, the face verification apparatus performs a verification process of a face of a user 110 to determine whether to permit the user 120 to use a service or function available or performed by the computing apparatus 120, or to control an extent of use of such a service or function, or of another computing apparatus or server, for example. The face verification apparatus acquires an input image of the face of the user 110 captured using one or more cameras 130 included in the computing apparatus 120. The camera(s) 130 may be image acquiring devices, for example, a light sensor, digital still camera, and a video camera of the computing apparatus 120. The input image(s) may thus be image(s) that are input to the face verification apparatus, as a target of the face verification. The input image(s) may include color images, grayscale images, and/or depth images, as only examples.

In such an example, if a determined similarity between features extracted from a registration image and feature extracted from a verification image meets respective thresholds dependent on the functions or purposes of the verification, and/or dependent how different feature recognition results are considered for such functions of purposes, then the user may be determined to be a valid user of the computing apparatus 120, the user may be permitted to gain access to a restricted area or zone, or the user may be authorized to access or implement a financial transaction or payment, as only non-limiting examples. In an example, there may also, or alternatively, be different thresholds (and/or different feature recognition result considerations) for different levels of access to the computing apparatus 120 or the example restricted area or zone, or the access or implementation of financial transactions or payments. Depending on the ultimate results of the verification, the user 110 may be notified of the successful verification through the display 150, or the example further operations may merely be available through the display 150 thereby inferring the successful verification. As another example, successfulness and non-successfulness of the verification may be notified to another user, server, or service.

Thus, in an example, the face verification apparatus may detect a face region 140 from the input image and respectively extract one or more features from the face region 140 using a plurality of hardware implemented recognizers. The recognizers are hardware implemented models extracting features, for example, a feature, feature vector, or feature map, from or corresponding to input information. For example, the recognizers may be respective neural networks or other machine learning models trained based on learning data, or recognizer portions of such neural networks or machine learning models. As another examples, such recognizers may be respective portions of the same neural network or machine learning model. The recognizers may also be considered feature extractors or discriminators. Each of the recognizers may further include one or more stages or levels of feature extraction or discrimination, as well as other stages or levels, to ultimately generate or output such extracted features.

The face verification apparatus compares the feature extracted by the recognizers to a feature registered through a face registration process, and determines whether the verification is successful based on a comparison result. With the above neural network or machine learning examples, such comparisons may be implemented by additional neural network or machine learning models, or within a same neural network or machine learning model that included the respective recognizer neural network portions. The user 110 corresponding to a valid user may register a face in the computing apparatus 120 through the face registration process at a first time, the computing apparatus 120 may then store recognized registration feature(s) of the user 110 determined as valid through the face registration process, which may then be considered by the face verification apparatus during a verification process at a second time.

In examples, the face verification apparatus may uses a plurality of such recognizers to enhance an accuracy of face verification with respect to an input image captured in various conditions during corresponding verification operations, and then determine similarities between results of the verification feature recognitions and the stored registration features, the results of which may then be differently or selectively used depending on the underlying recognition or verification operation/mode for which the face verification operation is being performed.

For example, the face verification apparatus may perform face recognition efficiently by setting different relationships between verification results of recognizers based on the respective purposes of verification modes and/or different levels or extent of such verification modes. In an example, a purpose may be for unlocking the verification apparatus, such as where the verification apparatus is a mobile device or personal computer, while another purpose may be permit access or use of financial information. Additionally, or alternatively, each such purpose may have different levels of access or authority. In the below example, two such example purposes will be discussed, a first example of a usability-based verification mode and a second example of a security-based verification mode, where input information and/or extracted features may be differently considered depending on which of the first example or the second example the user is performing, e.g., with a lesser security emphasis with the first example over the second example. Below, though such two example modes will be discussed, these examples are only for illustrative purposes and not intended to be limiting of example, as additional or alternative different emphasizing mode examples are available, e.g., in addition to various levels of security emphasis. Also, as noted above, while the example purpose of unlocking may be discussed with respect to the usability-based verification mode, or purpose of accessing or using of financial information may be discussed with respect to the security-based verification mode, such purposes may also respectively have different such levels of security emphases.

Accordingly, in the example usability-based verification mode, a user, service provider, and/or manufacturer may predetermine that usability may be more important than security for one or more select functions or purposes, or respective sub-functions or sub-purposes, of the verification apparatus. Rather, in the example security-based verification mode, a user, service provider, and/or manufacturer may predetermine that such security may be more important for one or more select functions or purposes, or respective sub-functions or sub-purposes, than usability. Again, as only non-limiting examples, the usability-based verification mode will be discussed as being applied in a verification situation for, for example, logging-in to a device and unlocking a device, while the security-based verification mode will be discussed as being applied to a verification situation for, for example, a payment and a financial service. A verification required intensity or confidence level may vary based on the example verification modes, e.g., with the face verification method or the face verification apparatus determining the appropriate verification intensity that is be applied flexibly based on a determined purpose of the verification. Accordingly, in an example, when face verification is performed at such a dynamically or flexibly applied verification intensity, based on the purpose of the verification, both usability and security may be provided or achieved, in a variable tradeoff relationship in terms of the verification intensity.

Figure 9:
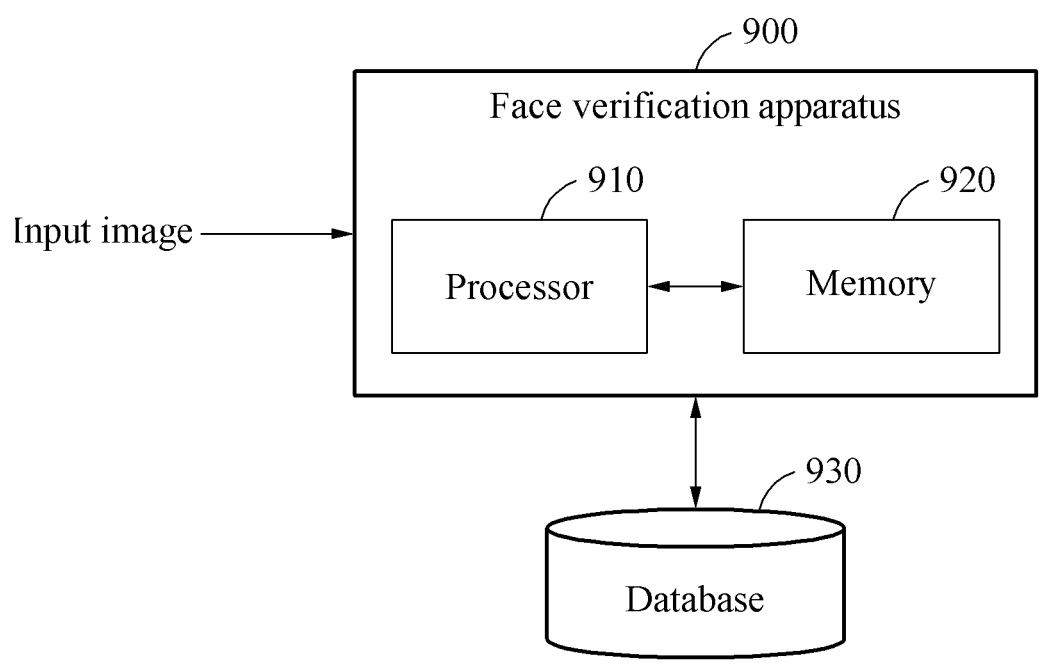
FIG. 9 is a block diagram illustrating an example of a face verification apparatus in accordance with one or more embodiments.
Figure 10:
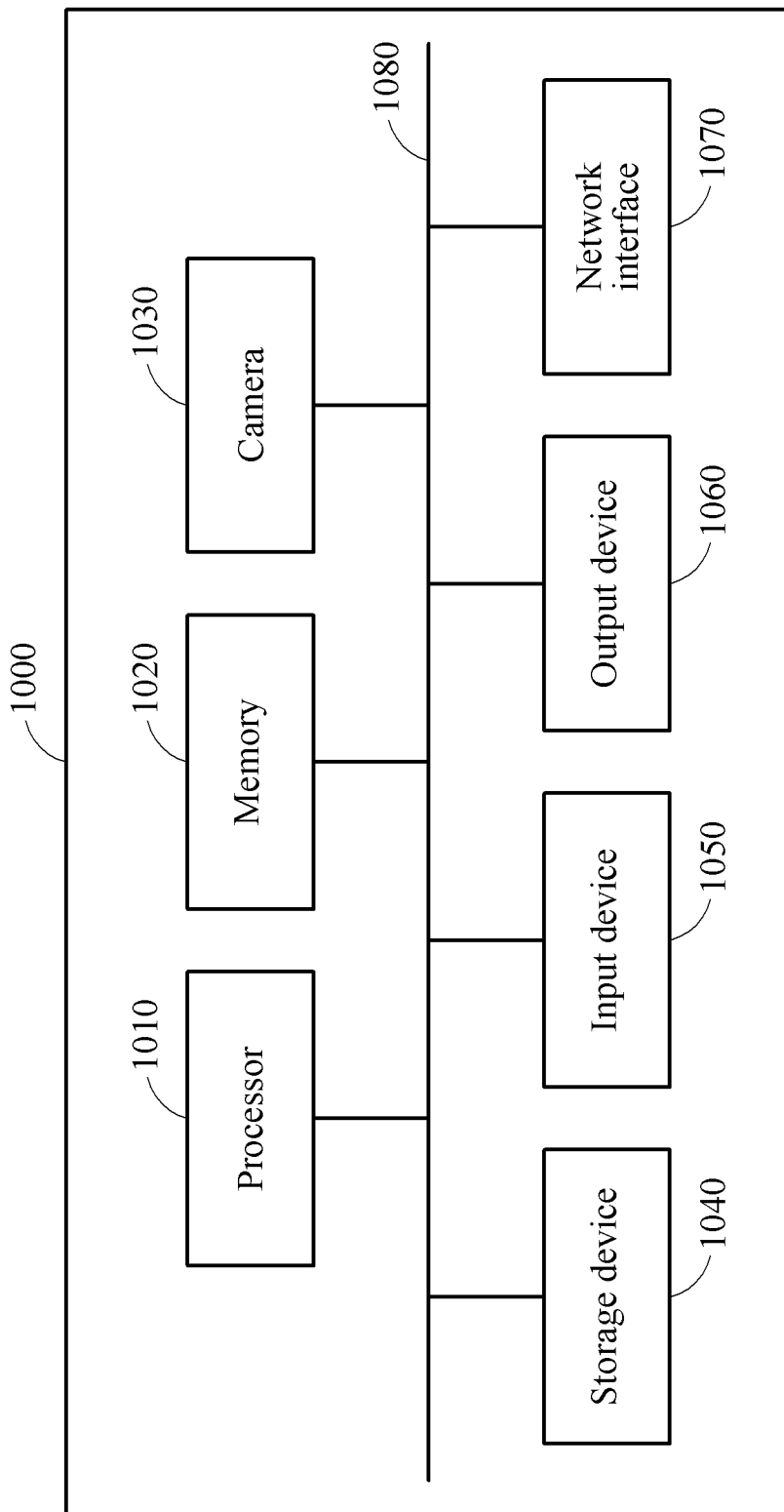
FIG. 10 is a diagram illustrating an example of a computing apparatus in accordance with one or more embodiments.
Figure 11:
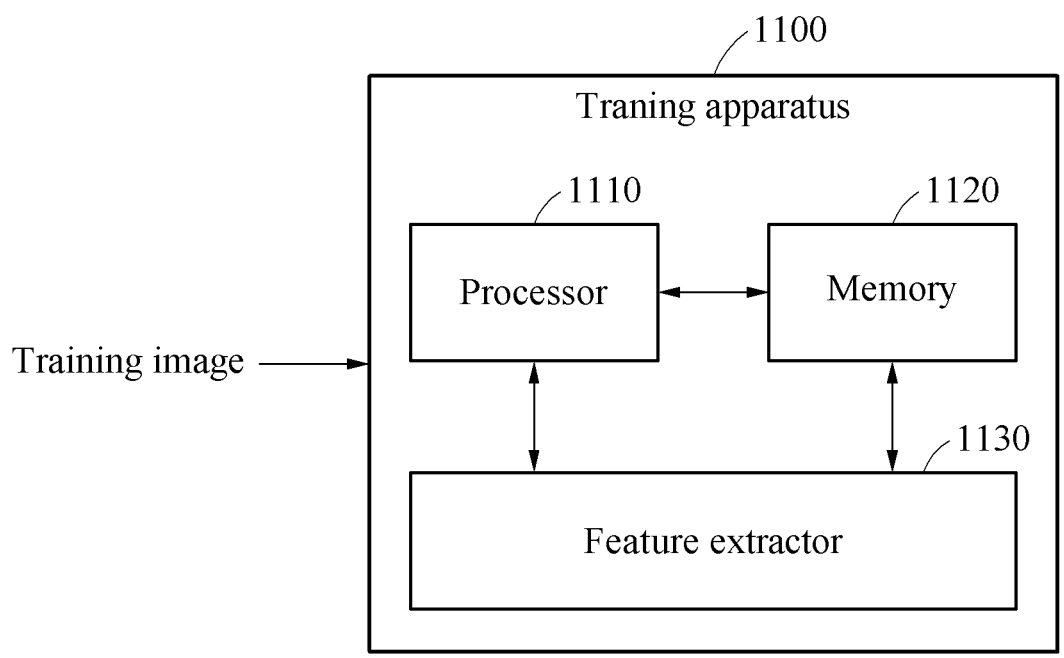
FIG. 11 is a diagram illustrating an example of a training apparatus in accordance with one or more embodiments.

In examples, such as the computing apparatus 120 of FIG. 1, the facial verification apparatus 900 of FIG. 9, computing apparatus 1000 of FIG. 10, and training apparatus 1100 of FIG. 11, each of which herein can individually and collectively be referred to as respective facial verification apparatuses, each facial verification apparatus includes one or more processors configured to perform face verification based on one or more verification images and to output a verification result, perform further operations based on the verification result, and/or perform face registration based on one or more registration images. The verification result indicates, e.g., either through explicit or inferential indications, whether a face included in the verification image corresponds to a valid user, for example. For example, when the face included in the verification image corresponds to the valid user, the verification result may include information indicating that verification has succeeded, and when the face included in the verification image does not correspond to the valid user, the verification result may alternatively include information indicating that the verification has failed. Alternatively, such as where face verification is performed for a device unlocking, payment function, or automatically performed or performed in a background operation, e.g., without request or potential knowledge of the user, a successful or failed verification result may not be explicitly reported to the user, but the successful or failure indications may be through inferential operations to control/institute additional operations (or non-operation of the same), or output results may be implicitly or explicitly indicated to another device or server that may receive or monitor results of the face verification or results of face verifications of one or more captured faces from one or more such facial verification apparatuses. Thus, the verification result may be indicated through, and used for, implementing or initiating of further processing of the facial verification apparatus, such as further processing operations in which user verification may be beneficial or required. As only examples, when the face included in the verification image is verified as a face of the valid user by the facial verification apparatus, the facial verification apparatus may unlock a user interface of the facial verification apparatus, such as when the facial verification apparatus is a user terminal, e.g., a smart phone or tablet, and the unlocking enables the user to access additional information or perform additional functions of user terminal, or the facial verification apparatus may control or indicate to an external device to permit entry of a user to a restricted area or zone due to the face verification. For example, the facial verification apparatus may be included or connected to a door entry system or may even be a door bell, or part of an automated door unlocking or locking system. In another example, through a successful facial verification by the facial verification apparatus, the facial verification apparatus may authorize financial or payment transactions to proceed or be initiated, as well as alternative operations or processes depending on embodiment.

The face verification is performed by comparing information on one or more verification images to information on one or more registration images. For example, a valid user registers a face image with the facial verification apparatus through the capturing of a registration image, e.g., by the facial verification apparatus, either automatically or upon user control. As non-limiting examples, the processor of the facial verification apparatus may be one or more processors of the facial verification apparatus that control additional operations of the example user terminal, or may be specialized processors specially configured for the face verification, e.g., as a GPU, reconfigurable processor, or specialized neural network or machine learning accelerated processor. When in the verification process of the facial verification apparatus the input image may be referred to as the verification image, while in the registration process of the facial verification apparatus the input image may be referred to as the registration image. In the registration process, the facial verification apparatus extracts features from the face of the valid user and stores the extracted features. The example neural network configuration for extracting features may also be trained previously using training data. When the user registration is completed, and when a verification image is received, the facial verification apparatus may analyze the verification image, extract feature(s) from the face of the user in the verification image, and perform the face verification by comparing the feature(s) extracted from the verification image and feature(s) of the registration image(s) stored in advance based on a verification threshold, for example.

The facial verification apparatus may be configured to perform one or more or all neural network or other machine learning verification trainings, registration operations herein without verification, one or more or all verification operations herein without performing the registration, or may be configured to perform any one or any combinations of the training, registration operations, and verification operations. In an example, one facial verification apparatus may capture a registration image, that facial verification apparatus or another facial verification apparatus may perform image registration, and that facial verification apparatus, the other facial verification apparatus, and/or still another facial verification apparatus may capture the verification image, and any of the facial verification apparatuses or still a further facial verification apparatus may perform the verification of the verification image based on the registered image, e.g., as registered and stored by any of such facial verification apparatuses. Any of the facial verification apparatus may train the extractor or verification models or neural networks, or still another facial verification apparatus may perform the training. Such facial verification apparatuses may be in communication and share, or respectively provide from respective storing of the same, any trained parameters, any registration image(s), any other image registration information including corresponding extracted features, any verification images, any other verification information including corresponding extracted features, and/or validation results of the verification processes. Thus, though examples below may refer to a facial verification apparatus acquiring a registration image, performing registration, acquiring a verification image, and performing verification as well as additional operations such as the training or other operations, embodiments are not limited to a single facial verification apparatus generating all such data, performing all such operations, or authorizing or implementing further operations or functions of a/the user device based on success or non-success results of the verification.

Figure 2:
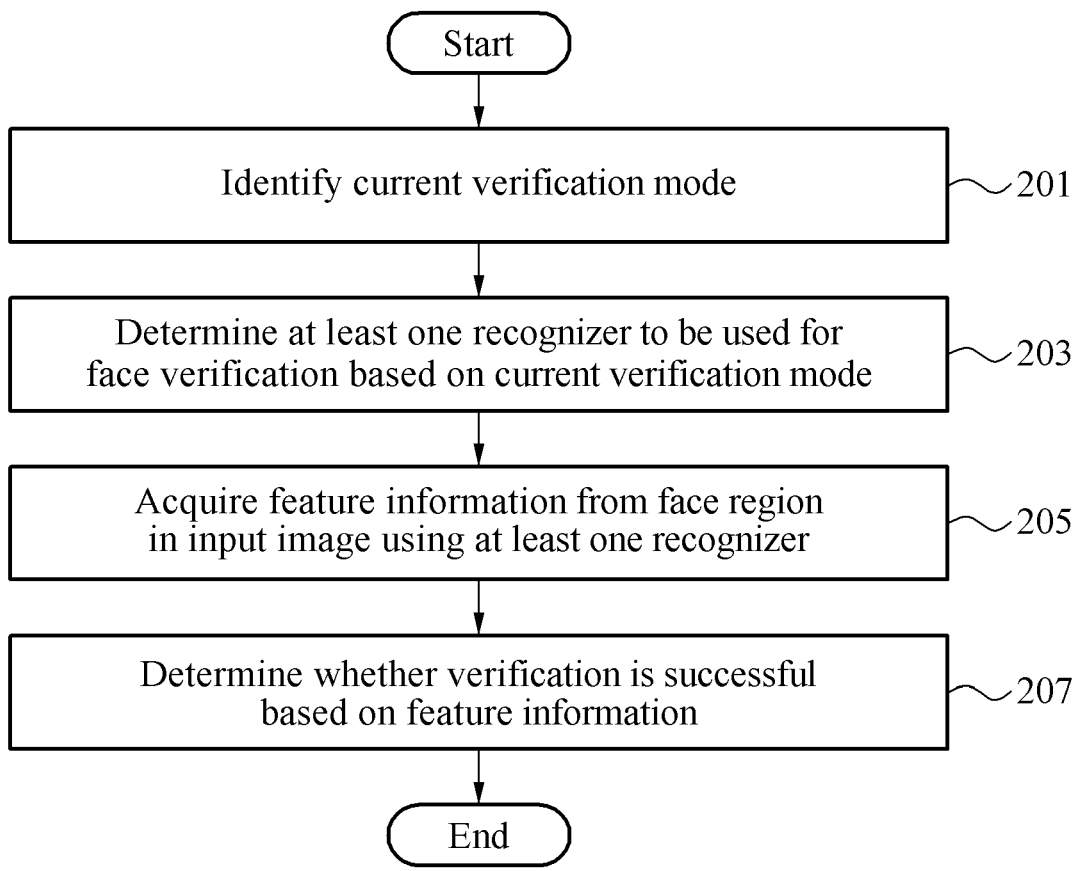
FIG. 2 is a diagram illustrating an example of a face verification method in accordance with one or more embodiments.

FIG. 2 is a diagram illustrating an example of a face verification method in accordance with one or more embodiments.

Referring to FIG. 2, in operation 201, the face verification apparatus identifies a current verification mode. There may be various verification modes respectively satisfying various authentication intensities, such as in a range between those verification modes variously focused more on usability and those verification modes variously focused more on security, e.g., in accordance with various intended uses of the face verification apparatus. For example, the verification modes may include an unlock verification mode based on the usability and a payment verification mode based on the security, and an example authentication intensity may include varied considerations of different recognizers and/or varied selection and use of select recognizers. A focus most or more on usability may include a consideration of any one of plural recognizers indicating a successful verification and/or a selection of recognizers whose objectives are to achieve any of the same for an easiest or easier authentication, while a focus most or more on security (e.g., at an opposite portion of the example usability to security range compared to the focus on most usability) may include a requirement that all plural recognizers indicate a successful verification and/or a selection of recognizers whose objectives are to achieve any of the same for a greater or greatest security in the authentication.

As another example of such varied usability to security intensities or varied foci, the current verification mode may be selected, e.g., from such plural available verification modes, based on a preset importance given to prevent a false rejection (FR), such as when unlocking a device, which may implement authentication with more focus on usability. An alternate current verification mode may be selected based on a preset importance given to prevent a false acceptance (FA), such as when performing a payment operation or accessing financial services, which may implement authentication with more focus on security. In these examples, the FR corresponds to a valid user being rejected, while FA corresponds to an invalid user being authenticated as a valid user.

For example, when performing the unlocking of a smartphone, a probability that a user attempting to be authenticated is a valid user may be relatively high, and thus, it may be more important to prevent FR in terms of the usability, i.e., compared to the importance of security for this condition or authentication purpose. In this example, the face verification may be performed based on a relatively low verification intensity. For example, when at least one of a plurality of verification results performed by different recognizers is determined as success, a final verification result may be determined as success, providing the relatively low verification intensity or the usability focus. In contrast, in a payment service, a higher security may be required to prevent an invalid user from being authenticated, providing a greater focus on security over usability. In this example, the face verification may be performed based on a relatively high verification intensity. For example, when at least one of a plurality of verification results performed by different recognizers is determined as failure, a final verification result may be determined as failure. The aforementioned verification situation and verification mode are merely examples, and thus, a verification mode may be provided in various forms through various combinations of verification results corresponding to a plurality of recognizers. Also, it is again noted that though such foci on usability compared to security are described as examples, these examples should only be considered as being non-limiting examples, as alternative various foci, intensities, or emphases may be available, and there may be similar various gradations of foci, intensities, or emphases between the different example various foci, intensities, or emphases. In addition, examples exist where such various foci, intensities, or emphases may also, additionally, or alternatively be selectable or set by a user.

Thus, in operation 203, the face verification apparatus determines or selects at least one recognizer to be used for face verification based on the determined current verification mode. Depending on which of plural available verification modes is determined to correspond to the current verification mode, the face verification apparatus may determine which of a plurality of recognizers are to be used for the face verification and/or determinative of how such recognizers are be used for the face verification.

Each recognizer may be trained to learn data associated with images captured in various conditions, thereby achieving robustness to the corresponding conditions. By using a plurality of recognizers, the face verification apparatus may more accurately verify a user using an input image captured in various conditions. Thus, based on the current verification mode, verification processes corresponding to the recognizers are then implemented.

For example, in operation 205, the face verification apparatus acquires or extracts feature information from a face region in an input image using the at least one recognizer. In operation 207, the face verification apparatus determines whether verification is successful based on the feature information.

The face verification apparatus may thus also detect a face region from an input image, and perform recognition on the detected face region. The face verification apparatus may detect the face region using, for example, a Haar-based cascade adaboost classifier and a Viola-Jones detector. Embodiments are not limited to these examples and thus, the face verification apparatus may detect the face region based on various face region detection schemes, with various resolutions, and various cropping from an example captured image.

In an example, the face verification apparatus may perform preprocessing on a received input image, e.g., before performing recognitions of the input image. Such an image preprocessing process may include at least one process of processing an input image to be more suitable for face verification. As non-limiting examples, the image preprocessing process may include any one or any two or more or any combination of a process of adjusting a size of the input image, a process of rotating the input image, a process of removing noise from the input image, a process of increasing a contrast in the input image, a deblurring process for removing blurs from the input image, a process of removing a background region, a warping process for correcting a distortion in the input image, a process of cropping a predetermined region in the input image, and a process of performing binarization on the input image. Hereafter references to the "input image" may be understood to refer to the input image on which image preprocessing has been performed when any of such preprocessing is performed and understood to refer to the input image without image preprocessing when such preprocessing is not performed, depending on embodiment.

The face verification apparatus acquires or extracts first feature information from image information of a face region using a first recognizer, for example. When a normalization process has been performed on the face region, the face verification apparatus acquires or extracts the first feature information from image information of the normalized face region using the first recognizer. As discussed further below, such recognizers may be a neural network model, or respective neural network models, trained based on learning data in advance of the verification operation. The acquired or extracted first feature information may be in a form of feature vector or feature map, for example, with the image information indicating a pixel value of a pixel included in the example captured or stored image or frames, also as only an example.

The face verification apparatus determines a first verification result based on the first feature information. The face verification apparatus compares the first feature information to pre-registered first registered feature information and determines the first verification result based on a result of the comparison. The face verification apparatus determines the first verification result to be success or failure based on the comparison result. For example, the first verification result is determined as success when a determined similarity between the first feature information and the first registered feature information meets, e.g., is greater than, a first threshold. Also, the first verification result is determined as a failure when the determined similarity fails to meet, e.g., is less than or equal, to the first threshold.

The face verification apparatus determines whether to perform an additional verification process, e.g., based on the current verification mode and/or the first verification result. Accordingly, the face verification apparatus determines whether to acquire or extract second feature information using a second recognizer dependent on the current verification mode and the first verification result. As noted above, and as only examples, the current verification mode may be previously determined based on a situation or purpose of the verification or the function or service available with the underlying device, or another device, for which the verification is being implemented.

In response to a determination that the second feature information is to be acquired or extracted, the face verification apparatus acquires or extracts the second feature information from image information of the face region using the second recognizer. Similarly to the first recognizer, the second recognizer may also be a neural network model trained based on learning data in advance of the verification operation. The second recognizer may differ from the first recognizer. For example, the first recognizer and the second recognizer may provide different verification performances or objectives with respect to a same condition. For example, the first recognizer may be trained to have a greater recognition rate than the second recognizer for an input image captured in a low-light environment, while the second recognizer may be trained to have a greater recognition rate than the first recognizer for an input image including a facial occlusion in a face region due to an obscured face. Facial occlusions may include glasses, sunglasses, a mask, or a hat, for example.

The face verification apparatus determines a second verification result based on the second feature information. The face verification apparatus compares the second feature information to pre-registered second registered feature information and determines the second verification result based on a result of the comparison. The face verification apparatus determines that the second verification result is success or failure based on the comparison result. For example, the second verification result is determined as success when a determined similarity between the second feature information and the second registered feature information meets, e.g., is greater than, a second threshold. Also, the second verification result is determined as a failure when the similarity fails to meet, e.g., is less than or equal to, the second threshold. In these examples, at least because the first and second recognizers may be different the first and second thresholds may be different. Alternatively, they may be the same.

In an example, and dependent on a current verification mode where the second verification is only implemented after the first verification result is determined a success, the face verification apparatus determines a final verification result based on the second verification result. Thus, in such an example, when the second verification result is success, the final verification result is determined to be success, while when the second verification result is failure, the final verification result is determined as failure. Alternatively, in an example and dependent on a current verification mode where the second verification is performed regardless of the success or failure determination of the first verification, if either of the first verification result and the second verification result are determined to be successes, then the final verification may be determined a success.

Likewise, examples exist where the face verification apparatus uses three or more recognizers. In one example of a current verification mode that implements three or more recognizers, after the first is determined a success, the second verification is performed, and after the second verification is a success the third verification with a third recognizer is performed, so a result of verification performed by a last recognizer may be determined as the final verification result. In another example where a current verification mode implements three or more recognizers, if any respective verifications with respect to any of the recognizers is determined a success, the final verification is determined a success.

Figure 3:
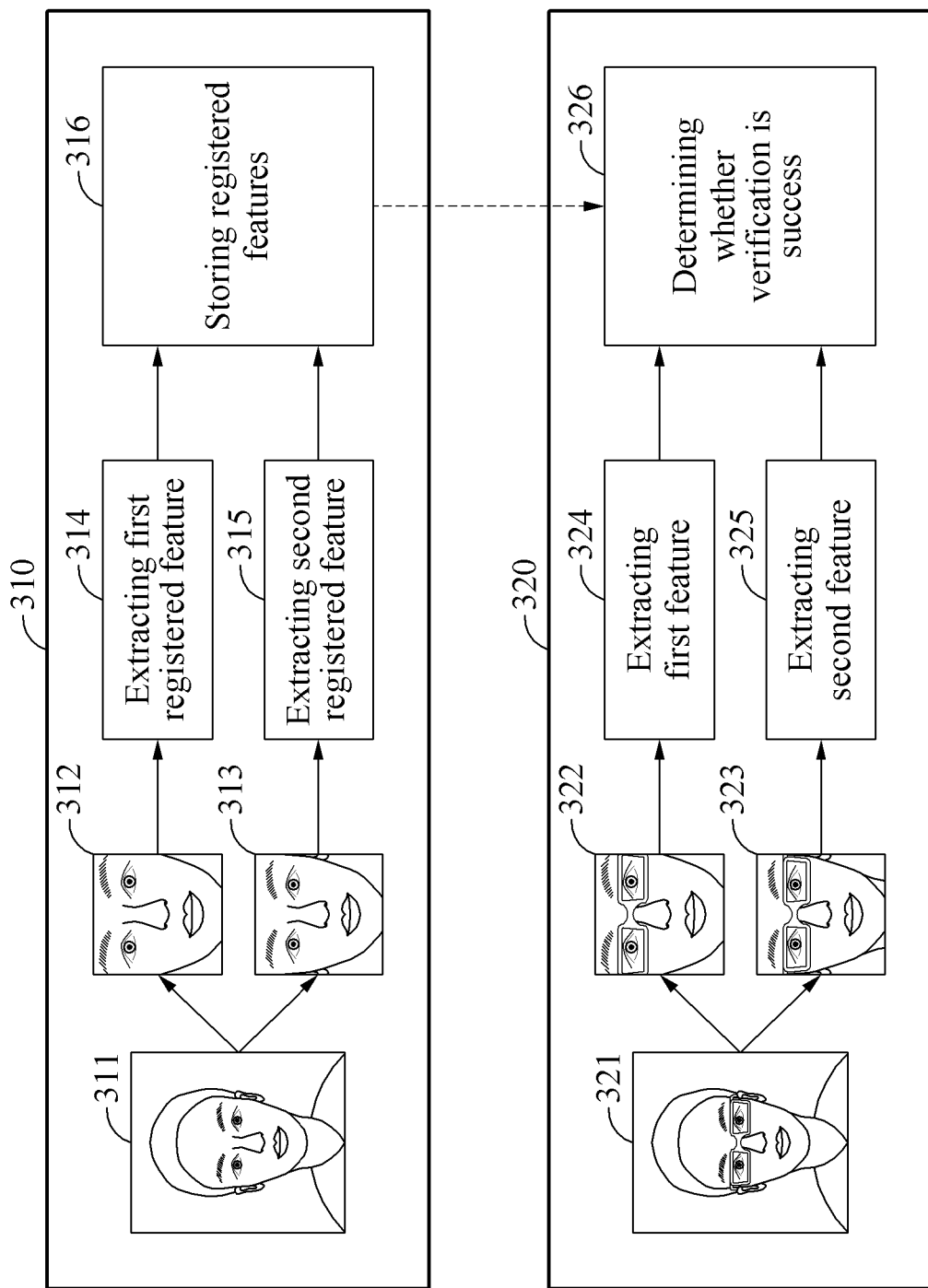
FIG. 3 is diagram illustrating a face registration process and a face verification process in accordance with one or more embodiments.

FIG. 3 is diagram illustrating a face registration process and a face verification process in accordance with one or more embodiments.

A face registration process 310 is performed prior to a face verification process 320. In the face registration process 310, a face region is detected from a captured or stored image used for face registration, i.e., a registration image, and then facial landmarks are detected from the detected face region. Herein, as only non-limiting examples, facial landmarks in the face region may be detected using a landmark detection method based on an active contour model (ACM), an active shape model (ASM), an active appearance model (AAM), a supervised descent method (SDM), and/or a neural network model.

The detected face region may be normalized based on the landmarks, such as to be respectively suitable for an input of each recognizer. Thus, a normalized image 312 may be generated by normalizing the face region to be suitable for an input of a first recognizer. Also, a normalized image 313 may be generated by normalizing the face region to be suitable for an input of a second recognizer. The respective normalization operations may be the same or they may be different, dependent on the respective input characteristics of the first and second recognizers. As only an example, if the first normalizer is a neural network then an input of the neural network would expect input data to have a particular form or be provided in a particular manner. For example, the expected form may relate to an expected size or resolution of input data, or expected arrayed or tensor forms of pixel information for the input data. Additional or alternative normalizations may also be implemented, such as to crop the input image to only the face region and/or to warp or rotate the face in the image for a centered or predetermined alignment.

In operation 314, a first registered feature is extracted from the normalized image 312 using the first recognizer. For example, when the first recognizer is robust to low light, the first recognizer may have been trained to compensate for typical degradations in recognition rates due to the low light so as to extract features even in low light conditions. Also, in operation 315, a second registered feature is extracted from the normalized image 313 using the second recognizer. For example, when the second recognizer is robust to an occlusion region, the second recognizer may have been trained to compensate for typical degradations in recognition rates due to the existence of occlusions in a face image so as to extract features even when occlusions may exist or based on the expectation of such occlusions. Registered features extracted through the aforementioned processes may then be stored in a database in operation 316, as respective registration features, for example.

In the face verification process 320, the face verification apparatus receives an input image 321 corresponding to a target of verification from an image acquiring device. A process of extracting feature information from the face verification process 320 may be similar to the face registration process 310. The face verification apparatus detects a face region from the input image 321 and normalizes the face region, such as to be suitable for an input of another first recognizer. Also, the face verification apparatus inputs a resulting normalized image 322 to the other first recognizer and extracts a first feature in operation 324. The face verification apparatus detects a face region from the input image 321 and normalizes the face region, e.g., to be suitable for an input of another second recognizer. Also, the face verification apparatus inputs a resulting normalized image 323 to the other second recognizer and extracts a second feature in operation 325. Here, for example, the first recognizer and the other first recognizer may be the same recognizer, and the second recognizer and the other second recognizer may be the same recognizer.

In operation 326, the face verification apparatus determines whether verification is successful based on the first feature and/or the second feature. The face verification apparatus determines a first verification result based on a result of a comparison between the first feature and the first registered feature stored in the database. Also, the face verification apparatus determines a second verification result based on a result of a comparison between the second feature and the second registered feature stored in the database. Thus, based on a current verification mode, a final verification result is determined using either or both the first verification result and the second verification result. In an example, when the final verification result is determined based on the first verification result, a process of determining the second verification result may selectively not be performed. For example, if the current verification mode requires only one of the first and second verification results to be a success for the final verification result to be a success, and the first verification result is a success then the process of determining the second verification result may not need to be performed. In this current verification mode example, if the first verification result is a failure, then the process of determining the second verification result would be further performed to determine whether at least one of the verifications are a success for a successful final verification. Alternatively, if the current verification mode requires both the first and second verification result to be successes, and the first verification result is a failure then the process of determining the second verification result may not need to be performed. In this current verification mode example, if the first verification result is a success, then the process of determining the second verification result would be further performed to determine whether both of the verifications are a success for a successful final verification.

Figure 4:
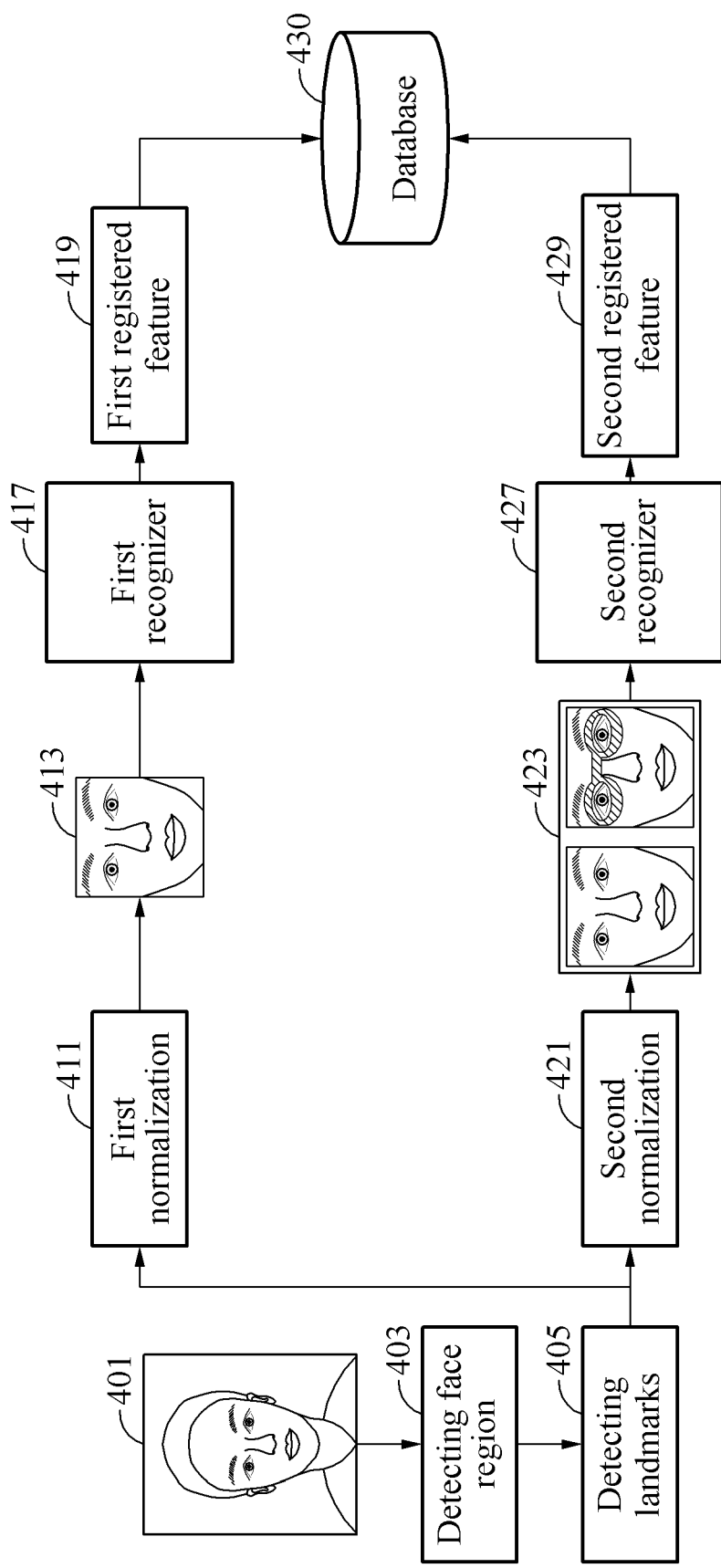
FIG. 4 is a diagram illustrating an example of a face registration process in accordance with one or more embodiments.

FIG. 4 is a diagram illustrating an example of a face registration process in accordance with one or more embodiments.

FIG. 4 illustrates an example of the face registration process as described with reference to FIG. 3. It is understood that the following description is merely a non-limiting example, with alternatives also being available. Referring to FIG. 4, an image 401 of a valid user may be input for face registration. In operation 403, a face region is detected from the image 401. In operation 405, landmarks are detected from the detected face region. In operations 411 and 421, respective normalizations, for example, a first normalization and a second normalization are performed on the face region, e.g., to be suitable for the respective inputs of each recognizer, and based on the detected landmarks.

The face verification apparatus performs the first normalization on the face region, e.g., to be suitable for an input of a first recognizer 417, in operation 411. The first recognizer 417 receives image information of a normalized face region 413 and outputs one or more first registered features 419 based on the normalized face region 413. The face verification apparatus performs the second normalization on the face region, e.g., to be suitable for an input of a second recognizer 427, in operation 421. The second recognizer 427 outputs one or more second registered features 429 based on input image information of the normalized face region 423. Here, though examples are provided where aspects of a same image of a same face region may be respectively considered by the first recognizer 417 and the second recognizer 427, e.g., after respective normalizations, examples are not limited thereto and different images and/or different face regions may be respectively considered between two or more of the different recognizers, in non-limiting examples. In addition, though examples are provided where the first recognizer 417 and the second recognizer 427 perform respective different feature extractions for respectively different verification operations, one or more of the different recognizers may rely on a same initial or later feature extraction as another of the recognizers, and/or any two or more of the different verification operations could differently depend on the same extracted features, as non-limiting examples.

The one or more first registered features 419 extracted by the first recognizer 417 and the one or more second registered features 429 extracted by the second recognizer 417 are stored in a database 430. Through such face registration process, registered features may be acquired to be used for subsequent determining whether a face is to be verified and dependent on the then determined current verification mode. When three or more recognizers are used, the respective registration features may be extracted, and similarly stored in the database 430.

Figure 5:
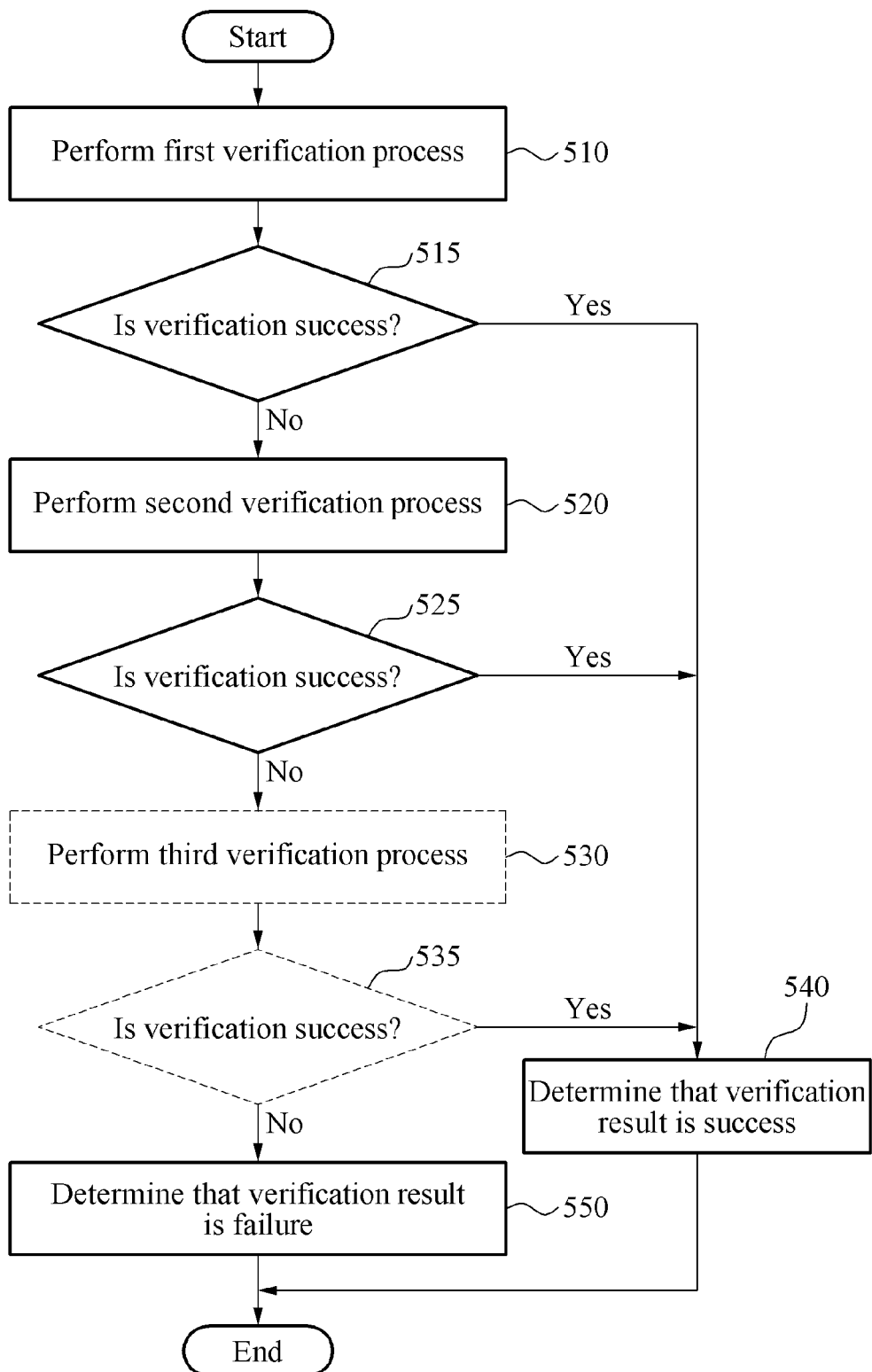
FIG. 5 is a flowchart illustrating a verification method based on a first verification mode in accordance with one or more embodiments.

FIG. 5 is a flowchart illustrating a verification method based on a first verification mode in accordance with one or more embodiments.

A first verification mode may be an example current verification mode focused on more easily verifying a valid user in comparison to a security concern of verifying an invalid user. For example, the first verification mode is an example current verification mode that may be selected or predefined to be applied when unlocking a smartphone. In this example first verification mode, when at least one or any one of a plurality of verification results with respect to respective feature recognitions or extractions is determined as a success, the face verification apparatus determines that a final verification result is a success and terminates the face verification process.

In operation 510, the face verification apparatus performs a first verification process. In the first verification process, the face verification apparatus extracts first feature information from an input image using a first recognizer. As described with reference to FIG. 2, the face verification apparatus may detect a face region from the input image, detect landmarks from the face region, and perform normalization based on the detected landmarks. The face verification apparatus may then extract the first feature information from the normalized face region.

In operation 515, the face verification apparatus determines whether the first verification process is a success. The face verification apparatus determines whether the first verification process is a success based on a result of a comparison between the extracted first feature information and first registered feature information stored in a database, such as described above with respect to FIGS. 3 and 4. In an example, the face verification apparatus may determine whether to acquire second feature information using a second recognizer based on the first verification mode and a result of the first verification process.

For example, when the result of comparison between the first registered feature information and the first feature information satisfies a preset condition, e.g., where a determined similarity between the first registered feature information and the first feature information meets a first threshold, the face verification apparatus determines that the verification result of the first verification process to be a success in operation 540 and terminates the face verification process. In this example, the successful verification result of the first verification process is the final verification result. When the result of the comparison between the first registered feature information and the first feature information does not satisfy the preset condition, e.g., where the determined similarity between the first registered feature information and the first feature information fails to meet the first threshold, the face verification apparatus determines that the verification result of the first verification process to be a failure and performs a second verification process. Likewise, the face verification apparatus may determine that the second feature information is to be acquired or extracted when the verification result of the first verification process is failure. Also, when the verification result of the first verification process is success, the face verification apparatus may determine that the final verification result is success and may terminate the face verification process.

In operation 520, the face verification apparatus performs the second verification process. In the second verification process, the face verification apparatus extracts the second feature information from the input image using the second recognizer. Similarly to the first recognizer, the face verification apparatus may normalize the input image before input to the second recognizer.

In operation 525, the face verification apparatus determines whether the second verification process is successful. The face verification apparatus compares the second feature information to second registered feature information stored in the database to determine whether the second verification process is successful. When the first verification mode includes a third recognizer, the face verification apparatus may determine whether to acquire or extract third feature information using the third recognizer and a result of the second verification process.

When the result of comparison between the second registered feature information and the second feature information satisfies a preset condition, e.g., where a determined similarity between the second registered feature information and the second feature information meets a second threshold, the face verification apparatus determines that a verification result of the second verification process to be a success in operation 540 and terminates the face verification process. In this example, the verification result is the final verification result. When the result of comparison between the second registered feature information and the second feature information does not satisfy the preset condition, e.g., where the determined similarity between the second registered feature information and the second feature information fails to meet the second threshold, the face verification apparatus determines that the verification result is failure. When the first verification mode does not include selectively implementing the third verification process, the face verification apparatus may determine that the final verification result is failure in response to the verification result of the first and second verification processes being failure, and determines that the final verification result is success in response to the verification result of the second verification process being success.

In operation 530, when the verification result of the second verification process is determined as failure and the first verification mode includes selectively implementing the third verification process, the face verification apparatus performs the third verification process. The third verification process is merely an example and thus, an additional verification process using a type of recognizer different from the first and second recognizers may also or altenratively be included in the face verification process. In the example third verification process, the face verification apparatus acquires or extracts third feature information using the third recognizer, e.g., based on a result obtained by combining a feature parameter of the first verification process and a feature parameter of the second verification process. For example, the respective feature parameters may each include feature information from the above feature extractions by each of the first and second recognizers.

In operation 535, the face verification apparatus determines whether the third verification process is successful. For example, the face verification apparatus may generate combined feature information by combining the first feature information extracted by the first recognizer and the second feature information extracted by the second recognizer. When a determined similarity result of a comparison between the combined feature information and correspondingly combined registered feature information that is similarly generated by combining the first registered feature information corresponding to the first feature information and the second registered feature information corresponding to the second feature information satisfies a preset condition, e.g., when the determined similarity meets a third threshold, the face verification apparatus determines the verification result to be success in operation 540 and terminates the face verification process. Conversely, when the determined similarity result of the comparison does not satisfy the preset condition, e.g., fails to meet the third threshold, the face verification apparatus determines that the verification result is failure in operation 550 and terminates the face verification process. In this example, the verification result of the third verification process is the final verification result.

Figure 6:
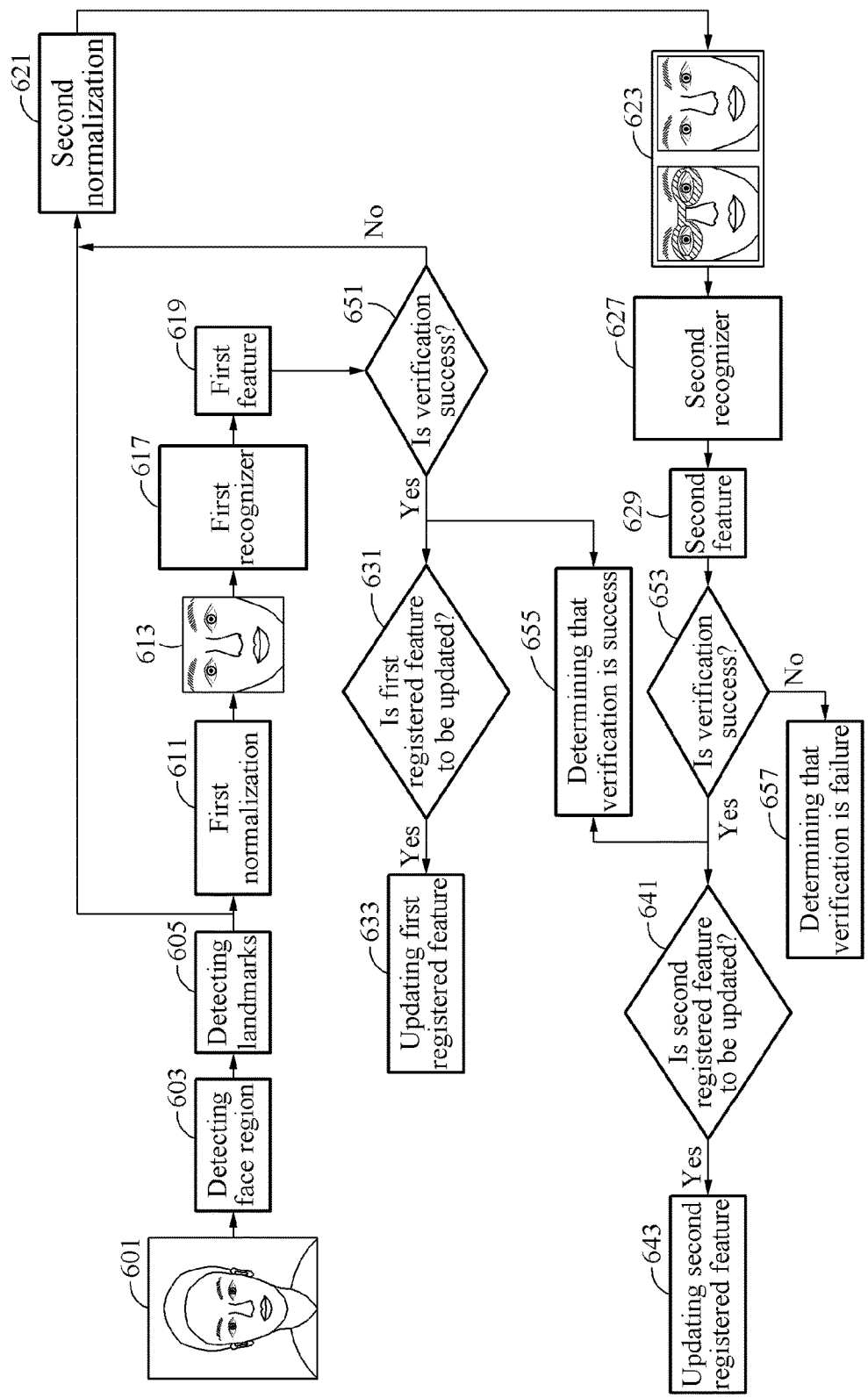
FIG. 6 is a diagram illustrating an example of an unlock mode of a verification mode in accordance with one or more embodiments.

FIG. 6 is a diagram illustrating an example of an unlock mode of a verification mode in accordance with one or more embodiments.

A face verification apparatus may operate in an unlock mode or determine that the user is using the face verification apparatus to perform an unlock function of the face verification apparatus. The unlock mode may be an example of the first verification mode of FIG. 5, for example, noting that embodiments are not limited thereto and noting that the first verification mode is also not limited to the example unlock mode, but rather, the first verification mode may be representative of multiple different verification modes that may variably emphasize usability over security, as only examples. The face verification apparatus may detect a face region from an input image 601 in operation 603. In operation 605, the face verification apparatus may detect landmarks from the detected face region. In operation 611, the face verification apparatus may then perform a first normalization on the face region, e.g., to be suitable for an input of a first recognizer 617.

For example, the face verification apparatus may normalize the detected face region by matching positions of the detected landmarks to predefined reference position(s), and/or by adjusting a size and/or rotation of the detected face region. As only an example, when a portion of the user's face, e.g., a lower face portion of the user's face, is out of a visual field of the camera capturing the input image, the camera may not capture the lower face portion of the user's face, and thus, the captured input image may include only middle and upper portions of the user's face. In this example, the face verification apparatus may normalize the captured face region, e.g., as if the whole face had been captured, and then synthesize the lower face region of the input image from predetermined image information corresponding to a same or similar region corresponding to the lower face region. For example the predetermined image information may be a predetermined averaging of plural lower face portions from multiple faces. As another example, the predetermined image information may merely be an average value image where pixel information for the missing lower face region all has a same value previously determined as an averaged value of such plural lower face portions, or the average value image may merely have a value that is an average value of the remaining of the normalized image. Thus, for example, the resulting normalized image 613 may thus include a portion of the face as captured in the captured image and synthesized pixel values derived from such predetermined image information.

The face verification apparatus inputs the normalized image 613 to the first recognizer 617. The face verification apparatus extracts one or more first features 619 using the first recognizer 617. The face verification apparatus compares the one or more first features 619 to first registered feature(s) stored in a database to determine whether verification is successful in operation 651. In this example, the example first registered feature(s) may be one or more features extracted using the first recognizer 617, for example, from an input image of a valid user during a registration process.

The face verification apparatus calculates a similarity between the one or more first features and the one or more first registered features and compares the calculated similarity to a first threshold, thereby determining whether the verification is successful. When the similarity meets, e.g., is greater than, the first threshold, the face verification apparatus determines that the verification is successful in operation 655. In contrast, when the similarity fails to meet, e.g., is less than or equal to, the first threshold, the face verification apparatus determines that the verification is failed.

In response to a verification result being determined to be a success in operation 655, the face verification apparatus determines whether to update the first registered feature(s) based on the first feature information in operation 631. In operation 633, the face verification apparatus selectively updates the first registered feature by further comparing the calculated similarity to another threshold, for example, set to be greater than the first threshold. For example, if the further comparing results in a determination that the calculated similarity meets the other threshold one or more of the first registered features may be updated, replaced, or added/appended to, while if the determination is that the calculated similarity fails to meet the other threshold, then there may not be any updates, replacements, or additions/appendings to the first registered features based on the current first feature information. The updates, replacements, and/or additions/appendings may be made to the database storing the first registered feature(s).

In response to the verification result being determined as success in operation 655, the face verification apparatus may determine the final verification result to be a success and may terminate the face verification process. When the verification result is determined as failure, the face verification apparatus may then perform a second normalization in operation 621, for example, to generate a normalized image 623.

The face verification apparatus inputs the normalized image 623 to the second recognizer 627. For example, selectively based on a determination by the verification apparatus that occlusion region(s) are present in the input image or face region or automatically (e.g., irrespective of whether occlusion region(s), for example, due to glasses or a hat, are present in the input image or face region), the face verification apparatus may fill or synthesize a corresponding region where the occlusion area is, or is predicted to be present, with corresponding image information from an average image, an average value image, or a predetermined single color image, for example. For example, such an average image may be generated by respectively averaging each of the pixel values at corresponding positions from among plural training images, such as those training images used to train at least the second recognizer 627. In such an average image, the respective pixel values of the average image may change or be different based on the position of each of the pixels, and thus, a shape may appear even though the respective pixel values were derived by the respective averaging of pixel values from plural training images. The average value image may be generated by obtaining an average of pixels values of all pixels included in such training images and then selecting an average pixel value for all of the pixels of the average value image. In the average value image, all of the pixels may have the same pixel value, and thus, in which case a shape may not appear. The predetermined single color image may be an image with a single color value for each of the pixels of the single color image, which may be set independent of such training images, as only an example. This is merely an example and thus, a processing method of a case in which a face region includes, or may include, one or more occlusions is not limited to the example.

The face verification apparatus extracts one or more second features 629 using the second recognizer 627. The face verification apparatus compares the one or more second features 629 to second registered feature(s) stored in the database and determines whether the verification is successful in operation 653. The second registered feature(s) may be one or more features extracted using the second recognizer 627, for example, from an input image of a valid user during a registration process, such as the registration process performed to extract the aforementioned first registered feature (s), though embodiments are not limited thereto.

When the verification result is determined to be a success in operation 655, the face verification apparatus determines whether to update the second registered feature(s) based on the second feature 629 in operation 641, such as based on whether a calculated similarity between the one or more second features 629 and the second registered feature(s) meets a predetermined threshold that is greater than a threshold that is considered to determine whether the verification result is a success or failure. In response to a determination that the second registered feature(s) are to be updated, replaced, or added/appended to, the face verification apparatus updates, replaces, or adds/appends to the second registered feature(s) based on the one or more second features 629 in operation 643. When the verification result is determined to be a success in operation 655, the face verification apparatus determines that the final verification result is success. The updates, replacements, and/or additions/appendings may be made to the database storing the second registered feature(s).

When the verification result is determined as failure in operation 657, the face verification apparatus determines that the final verification result is failure, for example, and the face verification apparatus terminates the face verification process, or receives another input image to perform the first and second face verification processes again. For example, the face verification apparatus may be controlled to repetitively perform the face verification process on a series of input images or video frames received for a period of time, such as 6 seconds, through a continuous shooting of a camera until the final verification result is determined as success or the period of time has expired. Additionally, though first and second verification processes are discussed as being performed and then the verification process terminated or repeated for an example period of time, a success is achieved, or a predetermined number of final failures occur, if there are further stages of recognizers in addition to the example first recognizer 617 and the second recognizer 627, then such additional or subsequent face verification processes may be performed similarly to how the second verification process is performed subsequent to the first verification process to determine each respective final verification result.

Figure 7:
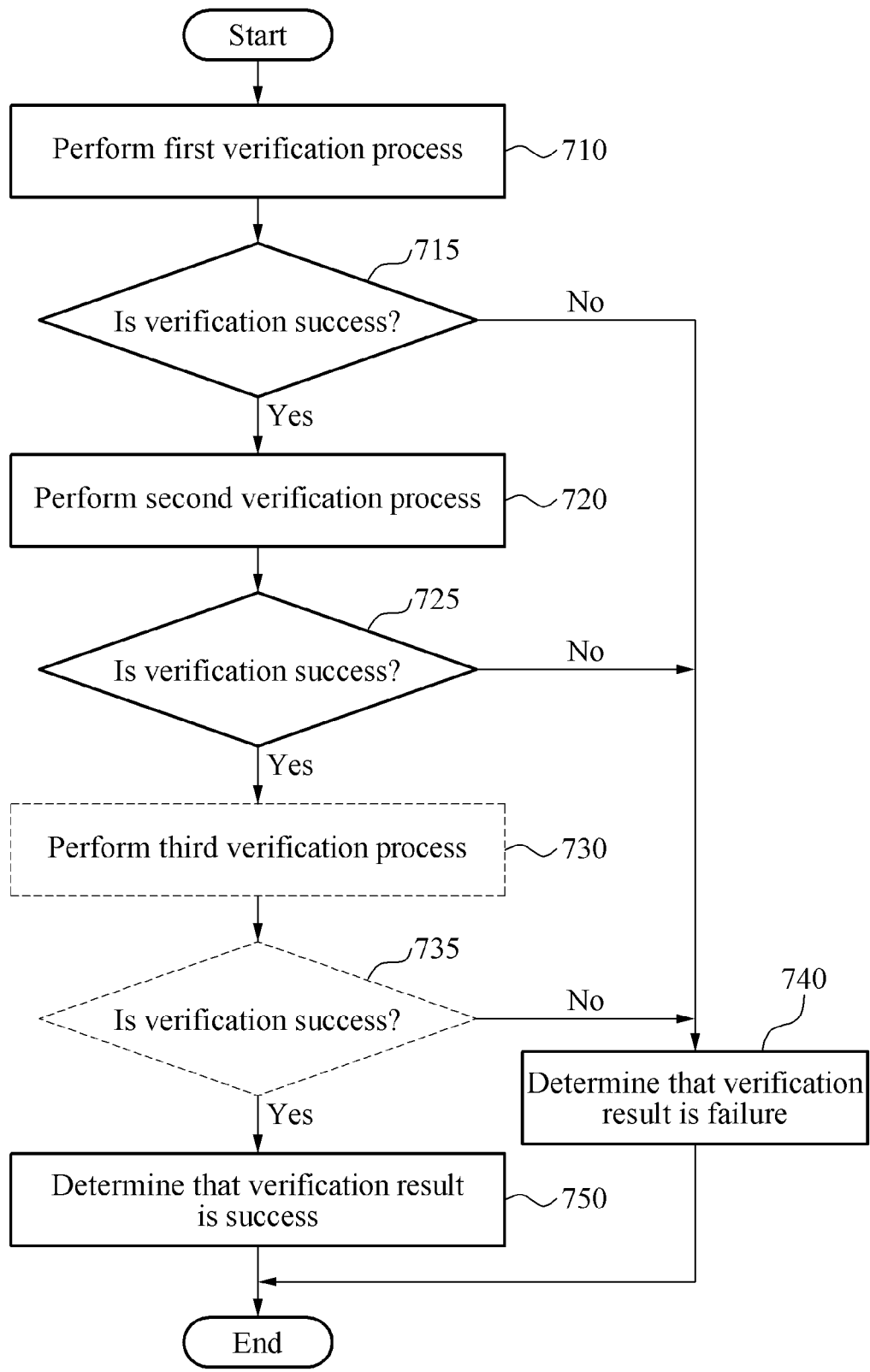
FIG. 7 is a diagram illustrating a verification method based on a second verification mode in accordance with one or more embodiments.

FIG. 7 is a diagram illustrating a verification method based on a second verification mode in accordance with one or more embodiments.

A second verification mode may be another example current verification mode that may focus or emphasize security in comparison to usability, e.g., compared to the more usability focus of the above example first verification mode of FIG. 5 or unlock mode of FIG. 6. For example, based on a determination by the verification apparatus as to the current function of the verification apparatus being implemented by the user, or service provided by the verification apparatus that the user is attempting to access or use, the verification apparatus may select an appropriate current verification mode. For example, in the above example of FIGS. 5 and 6, the verification apparatus may determine that the user is attempting to unlock the verification apparatus, and select or choose the above example first verification mode. In another example, the verification apparatus may determine that the user is attempting to use the verification apparatus to perform a payment function or to access financial information, and may thus select or choose the example second verification mode. Alternatively, the verification apparatus may be preset or configured, e.g., by a manufacturer or service provider, to automatically implement any of such example current verification modes without such determinations, and alternatively or additionally a user may be provided a user interface to select when/which such various foci, intensities, or emphases are implemented for any of the example verification modes. With the example of FIG. 7, as only an example, the second verification mode may be a mode that is controlled or selected to be implemented for verifying whether a user is valid for a payment function of the verification apparatus or whether the user is a valid user that is permitted to access to financial information stored on or made available by the verification apparatus. In this example, when at least one of a plurality of verification results during the second verification mode is determined as failure, the face verification apparatus determines that a final verification result is failure and terminates the corresponding face verification process.

In operation 710, the face verification apparatus performs a first verification process of the second verification mode. In the first verification process, the face verification apparatus extracts first feature information from an input image using a first recognizer. The examples and description of FIGS. 2-6 are also applicable to the processes of extracting feature information in the example of FIG. 7, and thus the descriptions thereof are not repeated here for brevity purposes. For example, and noting alternative examples are available, the first recognizer may be a recognizer that has been trained with respect to low light conditions.

In operation 715, the face verification apparatus determines whether the first verification process is successful. The face verification apparatus determines whether the first verification process is successful based on a result of comparison between the extracted first feature information and first registered feature information stored in a database. The face verification apparatus determines whether to acquire or extract second feature information using a second recognizer based on the second verification mode and a result of the first verification process.

When the result of comparison between the first registered feature information and the first feature information does not satisfy a preset condition, e.g., a corresponding similarity is determined to not meet a first threshold, the face verification apparatus determines that a verification result of the first verification process is failure in operation 740 and terminates the face verification process. In this example, the verification result is the final verification result. When the result of the comparison between the first registered feature information and the first feature information satisfies the preset condition, the face verification apparatus determines that the verification result of the first verification process is success and performs a second verification process. Likewise, the face verification apparatus may only determine that the second feature information is to be acquired or extracted when the verification result of the first verification process is success. Herein, though examples discuss a sequencing of implementation of such second or further subsequent verification operations dependent on the determined success or failure of an immediately previous verification operation, embodiments are not limited thereto, as feature extractions for one or more of the recognizers may be performed in parallel, just as any of the verification operations may be performed in parallel, and then the respective verification results from each of the verification operations considered together as to the final verification success or failure.

In the example of FIG. 7, in operation 720, the face verification apparatus thus next performs the second verification process dependent on the success of the first verification process. In the second verification process, the face verification apparatus extracts the second feature information from the input image using the second recognizer. The description of FIGS. 2-6 are also applicable to the processes of extracting feature information in the example of FIG. 7, and thus such examples and descriptions are not repeated here for brevity purposes. For example, and noting alternative examples are available, the second recognizer may be a recognizer that has been trained with respect to occlusions.

In operation 725, the face verification apparatus determines whether the second verification process is successful. The face verification apparatus compares the second feature information to second registered feature information stored in the database to determine whether the second verification process is successful. The face verification apparatus may then determine whether to acquire third feature information using a third recognizer based on the second verification mode and a result of the second verification process.

When the result of comparison between the second registered feature information and the second feature information does not satisfy a preset condition, the face verification apparatus determines that a verification result of the second verification process is failure in operation 740 and terminates the face verification process. In this example, the verification result is the final verification result. When the result of comparison between the second registered feature information and the second feature information satisfies the preset condition, the face verification apparatus determines that the verification result is success. When a third verification is not to be performed according to one example of the second verification mode, the face verification apparatus determines that the final verification result is failure in response to the verification result of the second verification process being determined as failure, and determines the final verification result as success in response to the verification result of the second verification process being determined to be successful.

In operation 730, when the example second verification mode further includes such an example third verification process, when the verification result of the second verification process is determined as success, the face verification apparatus performs the third verification process. As discussed in the example of FIG. 5, the third verification process may similarly be merely such an example, while alternatively an additional or alternative verification process using a different type of recognizer may also be included in the face verification process.

In operation 735, the face verification apparatus determines whether the third verification process is successful.

For example, similar to the example above with respect to FIG. 5, combined feature information may be generated by combining the first feature information extracted by the first recognizer and the second feature information extracted by the second recognizer. In this example, when a result of comparison between the combined feature information and combined registered feature information that is generated by combining the first registered feature information corresponding to the first feature information and the second registered feature information corresponding to the second feature information satisfies a preset condition, the face verification apparatus determines that the verification result is success in operation 750 and terminates the face verification process. When the result of this comparison does not satisfy this preset condition, the face verification apparatus determines that the verification result is failure in operation 740 and terminates the face verification process. In this example, the verification result is the final verification result.

Figure 8:
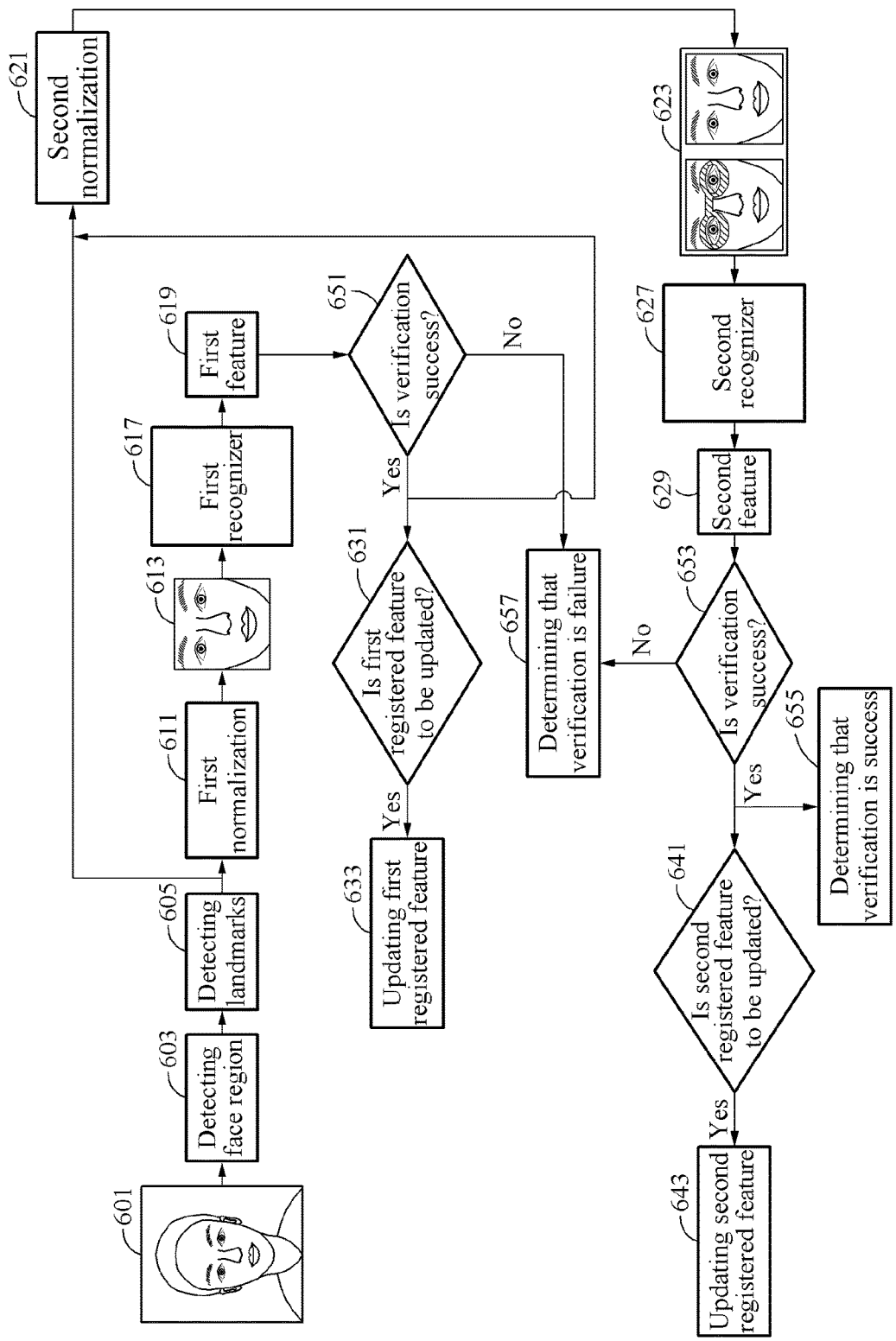
FIG. 8 is a diagram illustrating an example of a payment mode of a verification mode in accordance with one or more embodiments.

FIG. 8 is a diagram illustrating an example of a payment mode of a verification mode in accordance with one or more embodiments.

A face verification apparatus operates in a payment mode. The payment mode may be an example of the second verification mode of FIG. 7, for example, noting that embodiments are not limited thereto and noting that the second verification mode is also not limited to the example payment mode, but rather, the second verification mode may be representative of multiple different verification modes that may variably emphasize security over usability, as only examples. Here, it is also noted that such first and second verification modes have been discussed as examples of the current verification mode, additional or alternative verification modes may be available or selectable as the current verification mode, any of which may differently emphasize or focus on additional or alternative aspects such as the usability and security of the verification apparatus.

Thus, similarly to the face verification process of FIG. 6, the face verification apparatus may detect a face region from the input image 601 in operation 603. In operation 605, the face verification apparatus may detect landmarks from the detected face region. For example, the face verification apparatus may perform the first normalization 611 on the face region to generate, reorganize, or transform image information into a form that is suitable for an input of the first recognizer 617. The face verification apparatus may then input the normalized image 613 to the first recognizer 617. Herein, in examples where such face normalization is not performed the input image, or less than a whole of the input image, such as corresponding to a detected face region(s), may be input to the respective recognizer. In the current example, the face verification apparatus extracts the first feature 619 using the first recognizer 617. The face verification apparatus compares the first feature 619 to a first registered feature stored in a database to determine whether verification is successful in operation 651.

In response to a verification result of the comparison being determined as success in operation 655, the face verification apparatus determines whether to update, replace, or add/append the first registered feature(s) based on the first feature information, e.g., the one or more first features 619, in operation 633.

For example, in operation 633, the face verification apparatus updates, replaces, or adds/appends the first registered feature(s) in/to the database, from which the first registered feature was acquired or accessed, by comparing the similarity to another threshold, for example, set to be greater than the first threshold. Alternatively, in response to the verification result being failure, the face verification apparatus determines that a final verification result is failure and terminates the face verification process.

The face verification apparatus further performs the second normalization 621, and inputs the normalized image 623 to the second recognizer 627. When a portion of the user's face, e.g., a lower face portion of the user's face, is out of a visual field of the camera capturing the input image, the camera may not capture the lower face portion of the user's face, and thus, the captured input image may include only middle and upper portions of the user's face. In this example, the face verification apparatus may normalize the captured face region, e.g., as if the whole face had been captured, and then synthesize the lower face region of the input image from predetermined image information corresponding to a same or similar region corresponding to the lower face region. For example the predetermined image information may be a predetermined averaging of plural lower face portions from multiple faces. As another example, the predetermined image information may merely be an average value image where pixel information for the missing lower face region all has a same value previously determined as an averaged value of such plural lower face portions, or the average value image may merely have a value that is an average value of the remaining of the normalized image. Thus, for example, the resulting normalized image 623 may thus include a portion of the face as captured in the captured image and synthesized pixel values derived from such predetermined image information. Additionally, alternatively, or selectively, the second normalization 621 may take potential occlusions into consideration. For example, selectively based on a determination by the verification apparatus that occlusion region(s) are present in the input image or face region or automatically (e.g., irrespective of whether occlusion region(s), for example, due to glasses or a hat, are present in the input image or face region), the face verification apparatus may fill or synthesize a corresponding region where the occlusion area is, or is predicted to be present, with corresponding image information from an average image, an average value image, or a predetermined single color image, for example. For example, such an average image may be generated by respectively averaging each of the pixel values at corresponding positions from among plural training images, such as those training images used to train at least the second recognizer 627. In such an average image, the respective pixel values of the average image may change or be different based on the position of each of the pixels, and thus, a shape may appear even though the respective pixel values were derived by the respective averaging of pixel values from plural training images. The average value image may be generated by obtaining an average of pixels values of all pixels included in such training images and then selecting an average pixel value for all of the pixels of the average value image. In the average value image, all of the pixels may have the same pixel value, and thus, in which case a shape may not appear. The predetermined single color image may be an image with a single color value for each of the pixels of the single color image, which may be set independent of such training images, as only an example. This is merely an example and thus, a processing method of a case in which a face region includes, or may include, one or more occlusions is not limited to the example. Also herein, such filling or synthesizing of image information may be considered a padding of image information. Further herein, padding may also be implemented in any normalizing process use predetermined pixel values for newly generated pixel values in addition to those of a detected face region, for example, such as by adding one or more columns and/or rows of zero, for example, valued pixels that may surround a portion or all of the detected face region in the final normalized image.

The face verification apparatus extracts the second feature 629 using the second recognizer 627. The face verification apparatus compares the second feature 629 to a second registered feature stored in the database and determines whether the verification is successful in operation 653. The second registered feature is a feature extracted using the second recognizer 627 from an input image of a valid user. Here, though the first recognizer 617 and the second recognizer 627 are similarly referred to with respect to FIGS. 6 and 8 with same reference numbers, such references are for convenience of explanation and, though one or both may be the same recognizers between the examples of FIGS. 6 and 8, one or both of the similarly referenced recognizers in FIGS. 6 and 8 may be different recognizers, e.g., differently trained for similar or different objectives using the same or different training information or images.

When the verification result with respect to the second feature 629 is determined as success in operation 655, the face verification apparatus determines whether to update, replace, or add/append the second registered feature(s) based on the second feature 629, i.e., the one or more second features 629, in operation 641. In response to a determination that the second registered feature is to be updated, replaced, or added/appended the face verification apparatus updates, replaces, or adds/appends the second registered feature in/to the database, from which the second registered feature was acquired or accessed, based on the second feature 629 in operation 643. The face verification apparatus determines the final verification result as success. When the verification result with respect to the second feature 629 is determined as failure in operation 657, the face verification apparatus determines that the final verification result is failure. If there are not further stages of recognizers to further consider the success or failure of the face verification, then face verification apparatus terminates the face verification process, or receives another input image to perform the face verification process again. If there are further stages of recognizers, then such subsequent face verification processes are performed similarly to how the second verification process is performed subsequent to the first verification process.

Herein, a neural network includes a plurality of layers, and each of the layers includes a plurality of nodes, and is implemented by one or more processors of the facial verification apparatus. For example, there may be an input layer, at least one hidden layer, and an output layer. Depending on the architecture of the neural network, nodes included in neighboring layers may be selectively connected according to respective trained connection weights and nodes within layers may be connected through kernels or other connection weights. For example, the neural network may be implemented by such a processor, i.e., the one or more processors of the facial verification apparatus, configured to generate a neural network structure/architecture with such a plurality of layers each including plural nodes and configured to apply such weighted connections between neighboring nodes in neighboring layers of the neural network structure, and/or kernel elements and/or other weighted connection between nodes within such layers, to interpret input data applied to the neural network structure. As only examples, herein such an 'interpretation' of input data may include a performed feature extraction, recognition, verification, and/or rejection, such as for image recognition or verification, as well as any other trained objective(s) of the respective layers, collection of layers, and/or whole neural network, such as where a layer or collection layers is represented by any of the feature recognizers described herein that may each be trained for different feature extraction objectives, for example, and which may be combined in a larger collection of layers (e.g., in various parallel and/or serial arrangements) with further classification or comparison layer(s) to perform the comparisons of extracted features with registered features, as well as an ultimate verification successfulness result. As an example of such a larger collection of layers, the above discussion with respect to FIG. 5 discusses combining first feature information and second feature information, which may be trained and subsequently implemented by parallel layers configured to implement the respective first and second recognizers and which may each be providing respectively extracted features to an example same subsequent layer for combined consideration, as a non-limiting example. Here, the example subsequent layer may also be configured to train and subsequently implement the example third recognizer further discussed with respect to FIG. 5. Thus, based on the training data and desired interpretation objective(s), the architecture, selective connections between neighboring nodes, and corresponding kernels and connection weights may be varied during training until the neural network is trained to a desired acceptability for the desired interpretation objective(s). For example, in examples where the neural network is trained for the image verification or rejection, the neural network may include convolutional layers or be representative of a convolutional neural network (CNN), and thus the respective convolutional kernel elements, e.g., for varying feature extractions through feature kernels and other connection weights may be trained to an original desired acceptability for feature extraction and/or face verification or rejection operations, such as performed by the training apparatus 1100 of FIG. 11. The neural network may also be of a different type of neural network and merely include one or more convolutional layers, e.g., for selective feature extraction, for other objectives. Returning to the training of the neural network, the resultant kernels and connection weights of the trained neuro network may be referred to as parameters of the neural network, e.g., demonstrated as at least trained kernel values of a convolutional layer or other connection weights between layers, as only examples. As an example, the neural network may be trained based on the labeled input image information or desired corresponding output images, feature extractions, or classifications, as only examples, such as through a loss considering backpropagation or simulated annealing algorithms. For example, the neural network may be trained to extract features of training data. Thus, in the training, connection weightings between nodes of different hidden layers and/or kernels of convolutional layers are recursively adjusted until the corresponding neural network model is trained with a desired accuracy rate or below a maximum error rate, for example. The trained neuro network may be stored in a memory of the training or recognition apparatus, for example, in any of the facial verification apparatuses discussed herein. In examples, the trained neural network may be stored in trained vectors, matrix or matrices, or other formats, e.g., where elements of the vectors, matrices, or other formats represent or suggest the corresponding trained parameters of trained weighted connections and/or kernels, as only examples, of the corresponding neural network structure. The stored trained neural network may further include hyper-parameter information, which may define the specific structure or architecture of the corresponding neural network for which the example stored trained parameters correspond to. The hyper-parameters may define the architecture or structure of the inputs and output layers as well as how many hidden layers there are and the function and structure/architecture of the respective hidden layers, such the respective arrangement and which are fully connected or dense, recurrent, bi-directionality, convolutional, de-convolutional, or pooling layers, as only examples. The hyper-parameters may further include information of the configuration and values of any bias and/or contextual nodes in the neural network, corresponding activation functions of the nodes, types of nodes, such as long short-term memory nodes, and define any or any further recurrent structures of the neural network, which may vary depending on embodiment and interpretation objective of the trained neural network.

Accordingly, before or during operations of FIGS. 2-8, as only examples, the facial verification apparatus may acquire such trained parameters, and input the captured or stored images as discussed herein to any of the extractors, as described, that are specially configured using the acquired trained parameters to perform the corresponding described operations as described with respect to the various recognizers and verifications described herein as non-limiting examples.

In addition, one or more of the feature recognizers or extractors implemented in, and represented by, operations 314, 315, 324, and 325 of FIG. 3, operations 417 and 427 of FIG. 4, operations 617 and 627 of FIG. 6, and operations 617 and 627 of FIG. 8, as only non-limiting examples, may also be implemented only through a specially configured hardware module or implemented through hardware and instructions stored in/on non-transitory media, e.g., of or exterior to the facial verification apparatus, that, when executed by one or more processors of the hardware, for example, cause the processor to implement any, any combination, or all of the operations described herein. Still further, though such operations refer to an example feature recognizers or extractors, each of such feature recognizers or extractors may include plural distinct recognizers or extractors trained for different objectives and which results thereof together may be used in the respective subsequent verification determination. As one example, such distinct recognizers or extractors for any one of the above noted feature recognizers or extractors could be reflected as respectively different trained kernels in a same convolutional layer of the example neural network. In addition, though a trained neural network (or respective neural networks) or machine learning implemented feature recognizers or extractors may be discussed with respect to FIGS. 2-9, embodiments are not limited thereto.

FIG. 9 is a block diagram illustrating an example of a face verification apparatus in accordance with one or more embodiments.

Referring to FIG. 9, a face verification apparatus 900 receives one or more input images for face verification. The input images may include color information, grayscale information, depth information, and/or infrared information, as only example. The face verification apparatus 900 determines whether verification is successful based on a result of comparison between one or more features extracted from the input image and one or more registered features stored in a database 930. For example, in a registration example the verification captures or receives an image of a valid user, registers the image and/or registered one or more features of the image, e.g., one or more features from one or more determined face regions of one or more users in the image, through a face verification process. The verification apparatus stores the registered information in the database 930.

The face verification apparatus 900 is configured to perform one or more or all face verification methods and processes described or illustrated in the present disclosure, e.g., including those of training recognizers and/or verification neural networks or other machine learning models, registering feature information obtained using such trained recognizers, and performing one or more verification processes of one or more verification modes using such trained recognizers and the registered feature information. The face verification apparatus 900 is further configured to implicitly and/or explicitly indicate or provide a result of face verification to a user, a remote server, or a service provider. For example, the face verification apparatus 900 may explicitly indicate or output the result of face verification in a form of, for example, a sound, a vibration, characters, a picture, and a moving image, but not limited thereto. As noted above, the face verification apparatus 900, which may correspond to any of the face verification apparatuses described herein, may indicate the verification result in various implicit and/or explicit forms.

The face verification apparatus 900 includes one or more processors 910 and one or more memories 920, hereinafter respectively referred to as the processor 910 and the memory 920. The memory 920 may be connected to the processor 910, and store instructions to be executed by the processor 910, data to be computed by the processor 910, or data processed by the processor 910, to control the processor 910 to implement one or more or all methods or processes described herein, for example. The memory 920 includes a non-transitory computer readable medium such as a high-speed random access memory (RAM) and/or a non-volatile computer readable storage medium, for example, one or more disk storage devices, flash memory device, or other non-volatile solid state memory device.

The processor 910 executes instructions to perform one or more operations described with reference to FIGS. 1 through 11. For example, the processor 910 detects a face region and facial landmarks from an input image and normalizes the input image. In an example, the normalizing may include normalizing the input image so as to be respectively suitable for an input of each recognizer based on the detected facial landmarks. The processor 910 may be configured to train the recognizers, as well as acquire or load trained parameters of the trained recognizers, and be configured according to the trained parameters to represent the respective recognizers through one or more neural networks or other machine learning models, as only examples. The processor 910 may also be configured to train verification portions of one or more neural networks or machine learning models, or further the same neural networks or machine learning models training as the recognizers, and configured to acquire or load the trained parameters for such verification portions to perform verification processes that compare features extracted by the recognizers to registration information for respective preliminary verification results and/or final verification results. In addition, the processor 910 may be further configured to perform the normalization and/or configured as the recognizers such that when a portion of the face region is out of a visual field of a camera or obscured (or predicted or available to be obscured) by an object such as glasses sunglasses, a mask, or a hat, the processor 910 performs padding on the portion based on a reference image, e.g., a filling or synthesizing of all or a portion of an image, an occluded face region, or a missing face region with predetermined image information, or corresponding image information from an average image, an average value image, or a predetermined single color image, as only examples.

In an example, the processor 910 is configured to identify a current verification mode, e.g., from plural predetermined verification modes and based on a determined function, service, and/or condition related to the user's use or determined desired use of the verification apparatus 900, and then determines, based on the identified current verification mode, which of one or more predetermined recognizers, e.g., to respectively extract feature information from input image information, are be used for the face verification, whether to perform the recognizers in parallel or in what serial sequence, and/or how to logically consider the respective verification results based on each recognizers extracted one or more feature information, e.g., whether any one of the verification results being a success means the final verification is a success or whether any one of the verification result being a failure means the final verification is a failure, or whether any two or more particular successes and/or any two or more particular failures would result in a final verification success or failure. In addition, though examples have been discussed where the recognizers consider image information, examples are not limited thereto, as one or more recognizers may further consider alternative extracted information, such as additional contextual information from alternative sensors extracted at a same or related time as the capturing of the image for which verification is performed, as non-limiting examples.

In the example where the recognizer extracts feature information from input image information, the processor 910 may extract a feature of an input face from the face region using one or more of such recognizers, compare the extracted feature(s) to registered feature(s), and determine whether the verification is successful based on a comparison result. The verification result may be a preliminary verification result, such as when the current verification mode includes implementing plural recognizers or different verification neural networks or machine learning models that are trained to differently consider the same extracted feature(s). After one or more of the verification processes have been performed, one or more of the corresponding preliminary verification results may be considered to determine the final verification result, i.e., according to the current verification mode. Also, when the verification mode includes performing the one or more verification processes repetitively over a period of time, until a successful verification, or until a predetermined number of failures occur, the example determined final verification result may be considered a preliminary final verification result and the result at the end of the period of time, at the successful verification, or at the predetermined number of failures may be determined the final verification result. As noted above, the processor 910 may further perform normalization of a detected face region that may include the aforementioned padding, or such padding may be performed subsequent to the normalization. After the final verification result is determined the processor 910 may terminate the face verification process.

In an example, the processor 910 selectively performs any of the verification modes. For example, one of the verification modes may be an example unlock mode. With this example unlock mode, when a verification result of a verification process corresponding to a first recognizer is determined as success, the processor 910 determines that a final verification result is success and terminates the face verification process. However, in this example unlock mode, when the verification result of the verification process corresponding to the first recognizer is determined as failed, the processor 910 performs a verification process using a second recognizer. In this example, the final verification result is determined based on a verification result corresponding to the second recognizer.

As another example, one of the verification modes may be an example payment mode. With this example payment mode, when the verification result of the verification process corresponding to the first recognizer is determined as failed, the processor 910 determines that the final verification result is failure and terminates the face verification process. However, in this example unlock mode, when a verification result of a verification process corresponding to a first recognizer is determined as success, the processor 910 performs the verification process using the second recognizer. In this example, the final verification result may be determined based on a verification result corresponding to the second recognizer.

FIG. 10 is a diagram illustrating an example of a computing apparatus in accordance with one or more embodiments.

Referring to FIG. 10, a computing apparatus 1000 performs a facial verification process by obtaining an image including a face of a user and comparing a feature extracted from the obtained image and a registered feature. The computing apparatus 1000 may correspond to the computing apparatus 120 illustrated in FIG. 1, the facial verification apparatus 900 illustrated in FIG. 9, as well as the training apparatus 1100 of FIG. 11, as non-limiting examples.

The computing apparatus 1000 includes a processor 1010, a memory 1020, a camera 1030, a storage device 1040, an input device 1050, an output device 1060, and a network interface 1070. The processor 1010, the memory 1020, the camera 1030, the storage device 1040, the input device 1050, the output device 1060, and the network interface 1070 may communicate with one another through a communication bus 1080.

The camera 1030 captures a still image, a video image, or both. The processor 1010 may control the camera 1030 to obtain or capture an image, e.g., including a face region, of a user by capturing an image for the face region of the user attempting at the facial verification, or may control the camera 1030 to autonomously capture images and automatically verify a user, for example, without user initiation. In addition, as noted above, the camera 1030 may also be controlled by the processor 1010 during other functions of the computing apparatus 1000, such as when operated as a personal camera. The camera 1030 may be representative of plural cameras, such as a color image/video camera and a depth or infrared camera or time of flight (TOF) module, as only non-limiting examples.

The processor 1010 may implement functions and instructions to operate in the computing apparatus 1000 as described herein. For example, the processor 1010 may execute instructions stored in the memory 1020 or the storage device 1040. The processor 1010 may be the same one or more processors as the processor 910 of FIG. 9 or the processor 1110 of FIG. 11. The processor 1010 is configured to perform one or more, any combination, or all operations described with reference to FIGS. 1 through 11. For example, the processor 1010 may be configured to perform registration and the facial verification by comparing the face image captured by the camera 1030 and the registered face image or corresponding registered features. In addition, the processor 1010 is configured to control other functions of the computing apparatus 1000. For example, the computing apparatus 1000 may be mobile device, such as a mobile phone, tablet, or personal computer, and thus the processor 1010 is further configured to implement other typical functions of the computing apparatus 1000. In an example, the processor 1010 may be configured to implement a lock-out operation to only permit a user to access or implement such other typical functions upon a successful verification of the user's captured face image, as discussed above.

The memory 1020 is a non-transitory computer readable media or device that stores information to be used for the facial verification. The memory 1020 may be the same memory as memory 920 of FIG. 9 and/or memory 1120 of FIG. 11, though examples are not limited thereto. The memory 1020 includes a computer-readable storage medium or a computer-readable storage device. In addition, memory 1020 is further representative of multiple such types of memory. The memory 1020 includes, for example, a RAM, a dynamic RAM (DRAM), a static RAM (SRAM), and other types of a nonvolatile memory well-known to the technical field to which the present disclosure pertains. The memory 1020 stores instructions to be implemented or executed by the processor 1010, and stores related information during software or an application being performed by the computing apparatus 1000.

The storage device 1040 includes a computer-readable storage medium or a computer-readable storage device. The storage device 1040 stores a DB including registered features or registered images. In one example, the storage device 1040 stores a greater quantity of information compared to the memory 1020, and stores information for a long period of time. The storage device 1040 includes, for example, a magnetic disk drive, an optical disc, a flash memory, an erasable programmable read-only memory (EPROM), a floppy disk, o other types of nonvolatile memories well-known in the technical field to which the present disclosure pertains.

The input device 1050 receives an input from the user through a tactile, video, audio, or touch input. The input device 1050 includes one or more of, for example, a keyboard, a mouse, a touchscreen, a microphone, and other devices configured to detect the input from the user and transmit the detected input to the computing apparatus 1000.

The output device 1060 provides the user with an output of the computing apparatus 1000 through a visual, auditory, or tactile channel. For example, the output device 1060 visualizes information related to the facial verification and provides the user with the visualized information. For example, the visualized information may indicate whether the facial recognition was successful, or may enable access to further functions of the computing apparatus 1000 demonstrated through the visualized information. The output device 1060 includes one or more of, for example, a liquid crystal display (LCD), a light-emitting diode (LED) display, a touchscreen, a speaker, a vibration generator, and other devices configured to provide the output to the user. In one example, during the facial registration or verification respectively being performed, the computing apparatus 1000 displays or visually feeds backs the currently captured face image, or a preview image, obtained by the camera 1030 on a display screen to be viewed by the user, or another guide, or does not display the example face image, preview image, or other guide. The example face image or preview image may provide such visual feedback or encouragement to guide the user to provide the computing apparatus 1000 a full face image. The visual feedback may be a display of the currently captured image frames from which the input image is to be selectively captured for the facial recognition, or may provide the user with illustrated guidelines or overlays for a desirable or preferred positioning and size of the to-be captured image for facial recognition. Such face image or preview image may also not be provided, such as in the example where such facial verification is automatically performed, e.g., without user initiation.

The network interface 1070 communicates with an external device through a wired and/or wireless network. The network interface 1070 includes one or more of, for example, an Ethernet card, optical transceiver, a radio frequency transceiver, and other network interface cards configured to transmit and receive information. The network interface 1070 may include a radio or transceiver configured to wirelessly communicate with the external device using a communication protocol, such as, for example, Bluetooth, WiFi, or a third generation (3G), fourth generation (4G), or fifth generation (5G) communication method. The network interface 1070 may further include a near field transceiver or the like. For example, through control of the processor 1010 upon verification of a user, the near field transceiver may transmit a payment authorization to an external terminal, such as with an appropriate mobile payment instruction transmitted by the near field transceiver. In addition, the processor 1010 may control the network interface 1070 to routinely check for updates for the registration and/or verification trained recognizer (or respective trained recognizer and verification portions) neural network(s), or other machine learning models, for example, and request, receive, and store parameters or coefficients of the same in the memory 1020 for use in the recognition and/or verification operations herein. For example, when the feature recognizers or extractors and face verifying is implemented though the above example trained neural network feature recognizers or extractors and/or trained face verifying networks, the processor 1010 may request, receive, and store updated trained weighting matrices for any or all of the recognizers or extractors and/or the face verifying neural network portions. In addition, updated hyper-parameters that can control or alter the configuration or architecture of such neural network(s) may also be requested, received, and stored along with corresponding trained weighting matrices in any of the memory 1020 or storage device 1040.

FIG. 11 is a diagram illustrating an example of a training apparatus in accordance with one or more embodiments.

Referring to FIG. 11, a training apparatus 1100 refers to an apparatus configured to train a feature extractor 1130 used for a facial verification, such as with respect to any or any combination of the feature recognizers described herein, as non-limiting examples. For example, the feature extractor 1130 may be a neural network model configured to output a result value corresponding to an input value, and trained based on plural training images and a reference image. The training apparatus 1100 may further train additional classification or comparison portions or objectives of such a neural network, in addition to the training of the example feature extractor 1130.

The training apparatus 1100 includes at least one processor 1110 and a memory 1120. The memory 1120 is a non-transitory computer readable medium or device connected to the processor 1110, and stores instructions implementable by the processor 1110 to implement such training of the neural network(s), data to be processed by the processor 1110, and/or data processed by the processor 1110 during the training of the neural network(s). The memory 1120 further stores the resultant trained parameters of the neural network(s) after the training.

As only an example, and further to the above example training operation discussions, when one or more training images are input to the training apparatus 1100, the processor 1110 detects respective face regions in the training image(s), extract features from the detected face regions, and respectively trains the example extractor 1130, e.g., with the extractor 1130 being representative of distinct feature recognizers or extractors discussed herein. The feature recognition or extraction may not be of a face image, face region, or otherwise detected face in some example feature recognizers or extractors, while in other example feature recognizers or extractors perform such recognition on an already detected face image, face region, or otherwise detected face, in combination for an ultimate verification operation. The training may be performed for the above noted different objectives, as discussed above with respect to the face registering and facial verification processes of FIGS. 2-9, and thus, for further detailed description, reference may be made to such above descriptions of the registration and facial verification processes provided herein.

In one example, the processor 1110 performs the training by calculating a loss that may be caused by a difference between a feature extracted by the feature extractor 1130 and an intended feature, and continues to train the feature extractor 1130 by adjusting parameters included in the feature extractor 1130 to reduce the calculated loss, as discussed above for training the example neural network or machine learning recognizer or extractor.

The training apparatus 1100 repetitively performs the process described in the foregoing on each of numerous training images in order to adjust the parameters of the feature extractor 1130 to be gradually desirable, such as through convolutional layer kernel element adjustments and connection weighting adjustments between nodes of different hidden layers being recursively adjusted until the corresponding neural network or machine learning example of the feature extractor 1130 is trained with a desired accuracy rate or below a maximum error rate, for example, such as through the above noted back-propagation example. Thus, all above descriptions about registration and facial verification processes are also applicable to the training apparatus 1100. Further, the processor 1110 may be configured to perform respective trainings to train the feature extractor 1130 in accordance with any of the above feature recognizer or extractor examples, the descriptions of which are applicable to the resultant trained structure and operation of the example feature extractor 1130. The trained feature extractor 1130 may then be used in the face registering process and the facial verification process described above with respect to FIGS. 1-9.

The computing apparatus 120, camera 130, display 150, respective recognizers, database 430, face verification apparatus 900, processor 910, memory 920, database 930, computing apparatus 1000, processor 1010, memory 1020, camera 1030, storage device 1040, input device 1050, output device 1060, and network device 1070, bus 1080, training apparatus 1100, processor 1110, memory 1120, and feature extractor 1130 in FIGS. 1-11 and that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RW, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented method of verifying a face, the method comprising:
   receiving a face image where a portion of a face region is obscured by an object;
   selecting a current verification mode, from among plural verification modes, to be implemented for the verifying of the face;
   determining one or more recognizers, from among plural recognizers, based on the selected current verification mode; and
   determining whether a verification is successful based on feature information obtained from the face image using the determined one or more recognizers, including processing the face region obscured by the object based on a reference image, the reference image comprising an average image generated by averaging each of the pixel values at corresponding positions from among plural training images.

2. The method of claim 1, wherein the object comprises one or more of glasses, sunglasses, a mask, and a hat.

3. The method of claim 1, wherein the one or more recognizers includes a first recognizer and a second recognizer, and
   Wherein a first feature information obtained from the face image using the first recognizer is different from a second feature information obtained from the face image using the second recognizer.

4. The method of claim 1, further comprising applying the face image to the determined one or more recognizers to obtain the feature information.

5. The method of claim 1, further comprising:
   extracting respective feature information from respective normalizations of the face image using different determined recognizers based on the current verification mode,
   wherein the extracting of the respective feature information is selectively partially performed, based on the current verification mode, to focus on one of usability and security in the verifying of the face.

6. The method of claim 1, further comprises: performing the verification including selectively performing respective verification processes corresponding to a plurality of different recognizers based on a select combination and/or arrangement of the different recognizers dependent on the current verification mode.

7. The method of claim 6, wherein the respective verification processes each include comparing respective similarities, between differently extracted feature information and corresponding registration information, with corresponding thresholds.

8. A processor implemented method of verifying a face, the method comprising:
   receiving a face image where a portion of a face region is obscured by an object;
   selecting a current verification mode, from among plural verification modes, to be implemented for the verifying of the face;
   determining one or more recognizers, from among plural recognizers, based on the selected current verification mode;
   determining whether a verification is successful based on feature information obtained from the face image using the determined one or more recognizers; and
   performing the verification including comparing respective similarities, between differently extracted feature information and corresponding registration information, with corresponding thresholds.

9. A computing apparatus for verifying a face, the computing apparatus comprising:
   one or more processors configured to:
   receive a face image where a portion of a face region is obscured by an object;

select a current verification mode, from among plural verification modes, to be implemented for the verifying of the face;

determine one or more recognizers, from among plural recognizers, based on the selected current verification mode; and determine whether a verification is successful based on feature information obtained from the face image using the determined one or more recognizers, including processing the face region obscured by the object based on a reference image, the reference image comprising an average image generated by averaging each of the pixel values at corresponding positions from among plural training images.

10. The apparatus of claim 9, wherein the object comprises one or more of glasses, sunglasses, a mask, and a hat.

11. The apparatus of claim 9, wherein the one or more recognizers includes a first recognizer and a second recognizer, and Wherein a first feature information obtained from the face image using the first recognizer is different from a second feature information obtained from the face image using the second recognizer.

12. The apparatus of claim 9, wherein the one or more processors are further configured to apply the face image to the determined one or more recognizers to obtain the feature information.

13. The apparatus of claim 9, wherein the one or more processors are configured to extracting respective feature information from respective normalizations of the face image using different determined recognizers based on the current verification mode, wherein the extracting of the respective feature information is selectively partially performed, based on the current verification mode, to focus on one of usability and security in the verifying of the face.

14. The apparatus of claim 9, wherein, to perform the verification, the one or more processors are configured to selectively perform respective verification processes corresponding to a plurality of different recognizers based on a select combination and/or arrangement of the different recognizers dependent on the current verification mode.

15. The apparatus of claim 14, wherein the respective verification processes each include comparing respective similarities, between differently extracted feature information and corresponding registration information, with corresponding thresholds by the one or more processors.

* * * * *